(12) United States Patent
Ohwaki et al.

(10) Patent No.: US 8,189,104 B2
(45) Date of Patent: May 29, 2012

(54) APPARATUS, METHOD, AND COMPUTER PROGRAM PRODUCT FOR DETECTING MOTION VECTOR AND FOR CREATING INTERPOLATION FRAME

(75) Inventors: Kazuyasu Ohwaki, Kanagawa (JP); Yasutoyo Takeyama, Kanagawa (JP); Goh Itoh, Tokyo (JP); Nao Mishima, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1291 days.

(21) Appl. No.: 11/687,080

(22) Filed: Mar. 16, 2007

(65) Prior Publication Data

US 2008/0069221 A1   Mar. 20, 2008

(30) Foreign Application Priority Data

Sep. 19, 2006   (JP) ................................. 2006-253478

(51) Int. Cl.
*H04N 11/20*   (2006.01)

(52) U.S. Cl. ........ 348/451; 348/441; 348/443; 348/459; 348/699; 375/240.16

(58) Field of Classification Search .................. 348/441, 348/451, 699; 375/240.16
See application file for complete search history.

(56) References Cited

U.S. PATENT DOCUMENTS

| | | | |
|---|---|---|---|
| 4,771,331 A | | 9/1988 | Bierling et al. |
| 7,180,548 B2 * | | 2/2007 | Mishima et al. ............. 348/441 |
| 7,375,762 B2 * | | 5/2008 | Mishima et al. ............. 348/441 |
| 7,412,114 B2 * | | 8/2008 | Itoh et al. ....................... 382/300 |
| 7,561,621 B2 * | | 7/2009 | Itoh et al. .................. 375/240.16 |
| 2003/0156641 A1 * | | 8/2003 | Sohn ......................... 375/240.02 |
| 2003/0174777 A1 * | | 9/2003 | Itoh et al. .................. 375/240.16 |
| 2004/0046891 A1 * | | 3/2004 | Mishima et al. ............. 348/459 |
| 2004/0240551 A1 * | | 12/2004 | Itoh et al. .................. 375/240.16 |
| 2004/0246374 A1 | | 12/2004 | Mishima et al. |
| 2005/0025243 A1 * | | 2/2005 | Sohn et al. ................ 375/240.16 |
| 2005/0053291 A1 * | | 3/2005 | Mishima et al. ............. 382/236 |
| 2005/0100095 A1 * | | 5/2005 | Itoh et al. .................. 375/240.16 |
| 2005/0157792 A1 | | 7/2005 | Baba et al. |

(Continued)

FOREIGN PATENT DOCUMENTS

JP       07007713       1/1995

(Continued)

OTHER PUBLICATIONS

Decision of a Patent Grant dated May 12, 2009 corresponding to U.S. Appl. No. 11/687,080, filed Mar. 16, 2007.

*Primary Examiner* — Jefferey Harold
*Assistant Examiner* — Sam Huang
(74) *Attorney, Agent, or Firm* — Turocy & Watson, LLP

(57) ABSTRACT

An apparatus for creating an interpolation frame includes a first computing unit that computes a first motion vector in relation to a first block in a first reference frame, a second extracting unit that extracts a second block in a second reference frame based on the first motion vector, a first calculating unit that calculates a correlation between the first block and the second block, a third extracting unit that extracts a third block that is shifted from the second block by a certain number of pixels, a second calculating unit that calculates a correlation between the first block and the third block, and a third computing unit that computes a motion vector for an interpolation block based on a most-highly correlated block-pair.

15 Claims, 17 Drawing Sheets

U.S. PATENT DOCUMENTS

| | | |
|---|---|---|
| 2006/0222077 A1* | 10/2006 | Ohwaki et al. ............ 375/240.16 |
| 2006/0256238 A1* | 11/2006 | Mishima et al. .............. 348/459 |
| 2007/0153904 A1* | 7/2007 | Itoh et al. ................. 375/240.16 |
| 2007/0165719 A1* | 7/2007 | Itoh et al. ................. 375/240.16 |
| 2007/0230830 A1 | 10/2007 | Ohwaki et al. |
| 2010/0245674 A1* | 9/2010 | Yamasaki et al. ............. 348/699 |

FOREIGN PATENT DOCUMENTS

| | | |
|---|---|---|
| JP | 2002543687 | 12/2002 |
| JP | 2003163894 | 6/2003 |
| JP | 2005045700 | 2/2005 |
| JP | 2005051460 | 2/2005 |
| JP | 2006129181 | 5/2006 |

* cited by examiner

APPARATUS, METHOD, AND COMPUTER PROGRAM PRODUCT FOR DETECTING MOTION VECTOR AND FOR CREATING INTERPOLATION FRAME

CROSS-REFERENCE TO RELATED APPLICATIONS

This application is based upon and claims the benefit of priority from the prior Japanese Patent Application No. 2006-253478, filed on Sep. 19, 2006; the entire contents of which are incorporated herein by reference.

BACKGROUND OF THE INVENTION

1. Field of the Invention

The present invention relates to a technology for detecting a motion vector and creating an interpolation frame based on the motion vector.

2. Description of the Related Art

In general, there are two types of display devices, namely, an impulse-type display device and a hold-type display device. The impulse-type display device emits light only for a certain persistence period of fluorescent material after writing an image onto a screen of the display device. A cathode ray tube (CRT) display and a field emission display (FED) are categorized as the impulse-type display device, for example. The hold-type display device holds display of a last image frame until a new image frame is written. A liquid crystal display (LCD) and an electro-luminescence display (ELD) are categorized as the hold-type display device, for example.

One of drawbacks of the hold-type display device is a blur phenomenon that occurs while displaying a moving image. The blur phenomenon occurs because images of a plurality of frames are superposed and reflected in eyes when a moving object appears in the images across the frames and the eyes of an observer follow the movement of the moving object.

Until the previous frame is replaced with the next frame in the displayed image, the same previous frame is kept being displayed. Despite this, the eyes predict display of the next frame of the image, and observe the moving object by moving their sight to the moving direction of the moving object on the previous frame image. Furthermore, the eyes perform sampling of the image at intervals shorter than an inter-frame spacing of the moving image. As a result, the eyes visually recognize an image between two successive frames to compensate the spacing, thereby observing the blur phenomenon.

The problem can be solved by setting a shorter inter-frame spacing for displaying. This can also improve unnatural motion in a moving image with a few display frames. One of conceivable concrete approaches is to create an interpolation image by using motion compensation, which is used for an MPEG2, to interpolate between successive frames.

The motion compensation uses a motion vector detected by block matching. According to general block matching, an existing frame is divided into a plurality of blocks, and then each of the divided blocks is examined to search another frame for a similar area. Consequently, a motion vector between the divided block and the found similar area is obtained.

However, if an interpolation frame is created by using the motion vector obtained based on the existing frame, overlap or gap between blocks can be created on the interpolation frame, so that it is difficult to create a clean interpolation image.

To solve such problem, for example, Japanese Patent No. 2528103 and JP-A 2004-104656 (KOKAI) disclose a method for preventing creation of overlap or gap between blocks on an interpolation frame. According to the method, instead of the existing frame, the interpolation frame to be created is divided into a plurality of blocks, and then frames before and after the interpolation frame are searched.

SUMMARY OF THE INVENTION

According to one aspect of the present invention, an apparatus for creating an interpolation frame, the apparatus includes a first extracting unit that extracts a first block in relation to each of interpolation blocks from a first reference frame, the each of the interpolation blocks corresponding to a piece of a interpolation frame being located between the first reference frame and a second reference frame having an inter-frame distance n therebetween, and a distance between the interpolation frame and the first reference frame being k, where $k \leq n/2$; a first computing unit that computes a first motion vector in relation to each of the interpolation blocks, the first motion vector connecting each of the interpolation blocks and the first block; a second computing unit that computes a second motion vector that is obtained by multiplying the first motion vector by $[-(n-k)/k]$; a second extracting unit that extracts a second block in relation to each of the interpolation blocks, the second block being an area in the second reference frame determined by the second motion vector; a first calculating unit that calculates a correlation between the first block and the second block; a third extracting unit that extracts a third block in relation to the second block, the third block being located at a position shifted from a position of the second block by a certain number of pixels on the second reference frame; a second calculating unit that calculates a correlation between the first block and the third block that is extracted in relation to the second block corresponding to the first block; a first selecting unit that selects a most-highly correlated block-pair in relation to each of the interpolation blocks, from among a block pair of the first block and the second block and a block pair of the first block and the third block, using a calculation result obtained by the first calculating unit and a calculation result obtained by the second calculating unit; a third computing unit that computes a motion vector for the interpolation block based on the block pair selected by the first selecting unit; and a motion compensation unit that performs motion compensation based on the motion vector computed by the third computing unit.

According to another aspect of the present invention, an apparatus for detecting a motion vector, the apparatus includes a first extracting unit that extracts a first block in relation to each of interpolation blocks from a first reference frame, the each of the interpolation blocks corresponding to a piece of a interpolation frame being located between the first reference frame and a second reference frame having an inter-frame distance n therebetween, and a distance between the interpolation frame and the first reference frame being k, where $k \leq n/2$; a first computing unit that computes a first motion vector that connects the base block and the first block; a second computing unit that computes a second motion vector that is obtained by multiplying the first motion vector by $[-(n-k)/k]$; a second extracting unit that extracts a second block that is an area in the second reference frame determined by the second motion vector; a first calculating unit that calculates a correlation between the first block and the second block; a third extracting unit that extracts a third block that is obtained by shifting the second block by a certain distance per pixel in the second reference frame; a second calculating unit that calculates a correlation between the first block and the third block; a first selecting unit that selects a most-highly correlated block-pair from among a calculation result obtained by the first calculating unit and a calculation result obtained by the second calculating unit; and a third computing unit that computes a motion vector for a block pair based on the block pair selected by the first selecting unit.

According to still another aspect of the present invention, a method of creating an interpolation frame, the method includes extracting a first block in relation to each of interpolation blocks from a first reference frame by using a first extracting unit, the each of the interpolation blocks corresponding to a piece of a interpolation frame being located between the first reference frame and a second reference frame having an inter-frame distance n therebetween, and a distance between the interpolation frame and the first reference frame being k, where k≦n/2; computing a first motion vector in relation to each of the interpolation blocks by using a first computing unit, the first motion vector connecting each of the interpolation blocks and the first block; computing a second motion vector obtained by multiplying the first motion vector by [−(n−k)/k] by using a second computing unit; extracting a second block in relation to each of the interpolation blocks by using a second extracting unit, the second block being an area in the second reference frame determined by the second motion vector; calculating a correlation between the first block and the second block by using a first calculating unit; extracting a third block in relation to the second block by using a third extracting unit, the third block being located at a position shifted from a position of the second block by a certain number of pixels on the second reference frame; calculating a correlation between the first block and the third block that is extracted in relation to the second block corresponding to the first block by using a second calculating unit; selecting a most-highly correlated block-pair in relation to each of the interpolation blocks by using a first selecting unit, from among a block pair of the first block and the second block and a block pair of the first block and the third block, using a calculation result obtained by the first calculating unit and a calculation result obtained by the second calculating unit; computing a motion vector for the interpolation block by using a third computing unit based on the block pair selected by the first selecting unit; and performing motion compensation by using a motion compensation unit based on the motion vector computed by the third computing unit.

According to still another aspect of the present invention, a method of detecting a motion vector, the method includes extracting a first block in relation to each of interpolation blocks from a first reference frame; computing a first motion vector in relation to each of the interpolation blocks, the each of the interpolation blocks corresponding to a piece of a interpolation frame being located between the first reference frame and a second reference frame having an inter-frame distance n therebetween, and a distance between the interpolation frame and the first reference frame being k, where k≦n/2, the first motion vector connecting each of the interpolation blocks and the first block; computing a second motion vector that is obtained by multiplying the first motion vector by [−(n−k)/k]; extracting a second block in relation to each of the interpolation blocks, the second block being an area in the second reference frame determined by the second motion vector; calculating a correlation between the first block and the second block; extracting a third block in relation to the second block, the third block being located at a position shifted from a position of the second block by a certain number of pixels on the second reference frame; calculating a correlation between the first block and the third block that is extracted in relation to the second block corresponding to the first block; selecting a most-highly correlated block-pair in relation to each of the interpolation blocks, from among a block pair of the first block and the second block and a block pair of the first block and the third block, using a correlation calculation result between the first block and the second block and a correlation calculation result between the first block and the third block; and computing a motion vector for the interpolation block based on the selected block pair.

A computer program product according to still another aspect of the present invention causes a computer to perform the method according to the present invention.

DETAILED DESCRIPTION OF THE INVENTION

Exemplary embodiments of the present invention are explained below in detail with reference to accompanying drawings. However, the present invention is not limited to embodiments.

Figure 1:
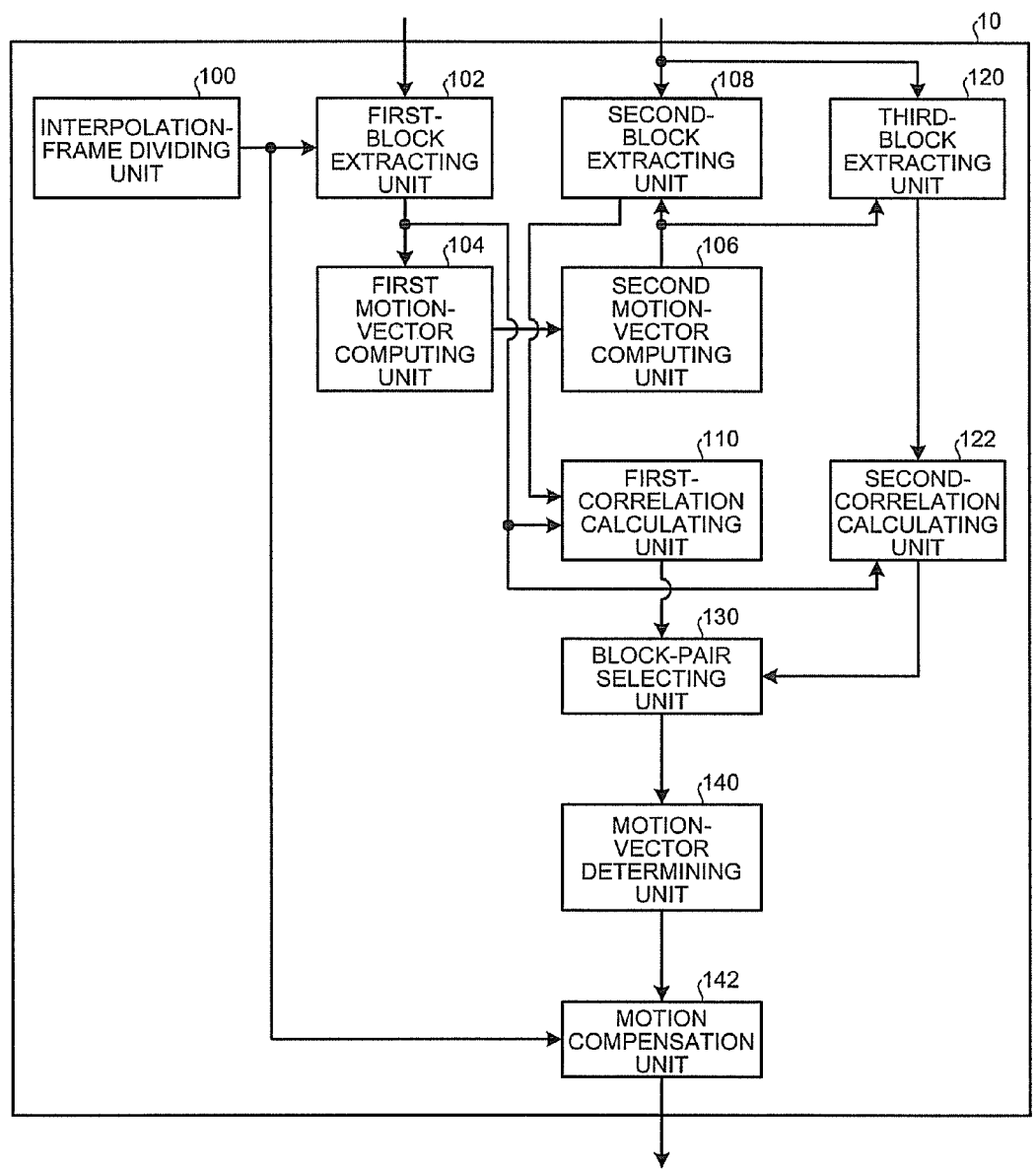
FIG. 1 is a functional block diagram of an interpolation-frame creating apparatus according to a first embodiment of the present invention.

As shown in FIG. 1, an interpolation-frame creating apparatus 10 according to a first embodiment creates an interpolation frame to interpolate between a first reference frame and a second reference frame included in an externally input moving image. Hereinafter, the first reference frame and the second reference frame are frames to be referred when an interpolation frame is created. For example, temporally successive two frames are acquired as a first reference frame and a second reference frame.

In another example, temporally discrete two frames can be selected as a first reference frame and a second reference frame to create an interpolation frame to interpolate between the two frames.

The interpolation-frame creating apparatus 10 includes an interpolation-frame dividing unit 100, a first-block extracting unit 102, a first motion-vector computing unit 104, a second motion-vector computing unit 106, a second-block extracting unit 108, a first-correlation calculating unit 110, a third-block extracting unit 120, a second-correlation calculating unit 122, a block-pair selecting unit 130, a motion-vector determining unit 140, and a motion compensation unit 142.

The interpolation-frame dividing unit 100 divides an interpolation frame, and obtains a plurality of interpolation blocks. The interpolation-frame creating apparatus 10 performs motion compensation based on the interpolation blocks. If motion compensation is performed based on an input frame, overlap or gap between blocks is sometimes created on the interpolation frame in some cases. However, by blocking reference frames based on the interpolation blocks, the interpolation-frame creating apparatus 10 can prevent creation of overlap or gap between blocks on the interpolation frame, and efficiently create a more accurate interpolation image.

Figure 2:
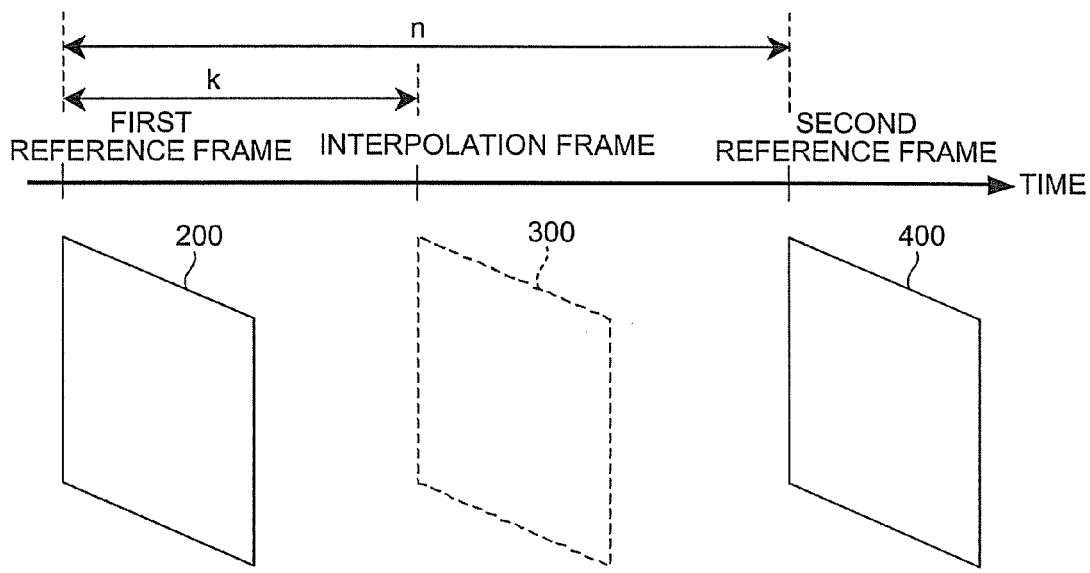
FIG. 2 is a schematic view for explaining an interpolation frame created by the interpolation-frame creating apparatus shown in FIG. 1.

As shown in FIG. 2, it is assumed that n denotes a temporal distance between a first reference frame 200 and a second reference frame 400, and k denotes a temporal distance between the first reference frame 200 and an interpolation frame 300, where k<n.

In the example shown in FIG. 2, the interpolation frame 300 is positioned in the middle between the first reference frame 200 and the second reference frame 400 (k=n/2). However, the position of the interpolation frame 300 is not limited to this, but can also be at any position where k<n. In this case, the frame closer to the interpolation frame 300 is the first reference frame.

In other words, although the first reference frame is a temporally antecedent frame and the second reference frame is a later frame in FIG. 2, alternatively, a first reference frame can be a frame later than a second reference frame. The position of the interpolation frame 300 is supposed to be always at a position where k≦n/2.

Returning to FIG. 1, the first-block extracting unit 102 acquires a first reference frame from an image that is externally input. The first-block extracting unit 102 then extracts a first block from the first-reference frame. The first block has the same size and the same shape to the interpolation block. The first-block extracting unit 102 extracts all of first blocks that are obtained by shifting pixel by pixel on the first reference frame.

The first motion-vector computing unit 104 computes a first motion vector MV1. The first motion vector MV1 is a vector that connects between an interpolation block from among the interpolation blocks and a first block from among the first blocks. The second motion-vector computing unit 106 computes a second motion vector MV2 that is determined based on the interpolation block with the first motion vector MV1.

Figure 3:
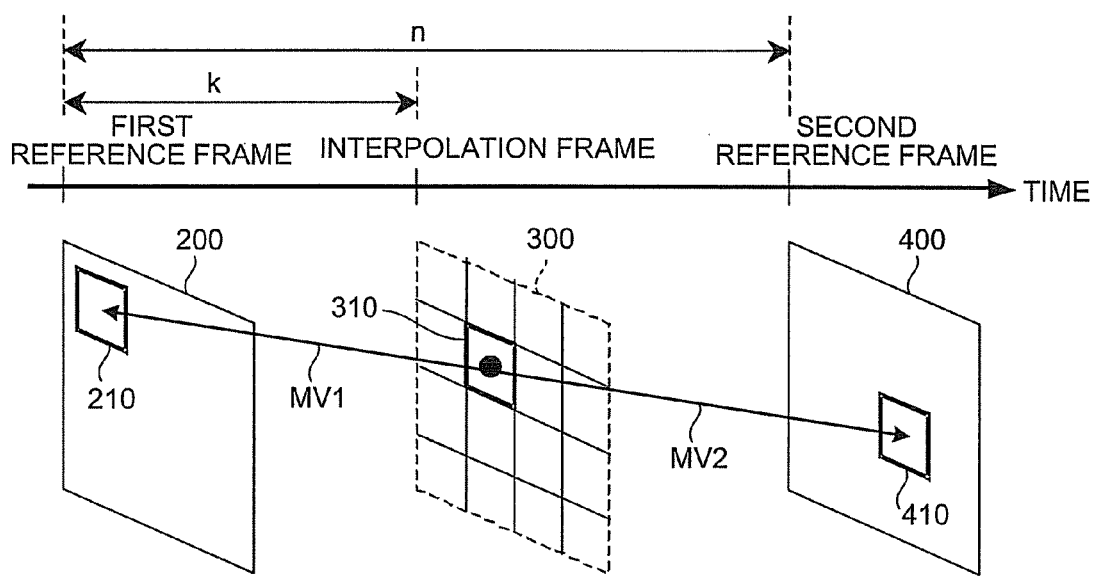
FIG. 3 is a schematic view for explaining a first motion vector and a second motion vector according to the first embodiment.

The second-block extracting unit 108 extracts a second block from the second reference frame based on the second motion vector MV2. As shown in FIG. 3, the first motion vector MV1 is a vector that connects between an interpolation block 310 and a first block 210 extracted by the first-block extracting unit 102.

The second motion vector MV2 is a vector that extends inversely to the first motion vector MV1 with respect to the interpolation block 310. The second motion vector MV2 ends on the second reference frame 400. The second motion-vector computing unit 106 computes the second motion vector MV2 according to the following Equation (1):

$$MV2 = \{-(n-k)/k\}MV1 \qquad (1)$$

A second block 410 is determined with the second motion vector MV2.

Figure 4:
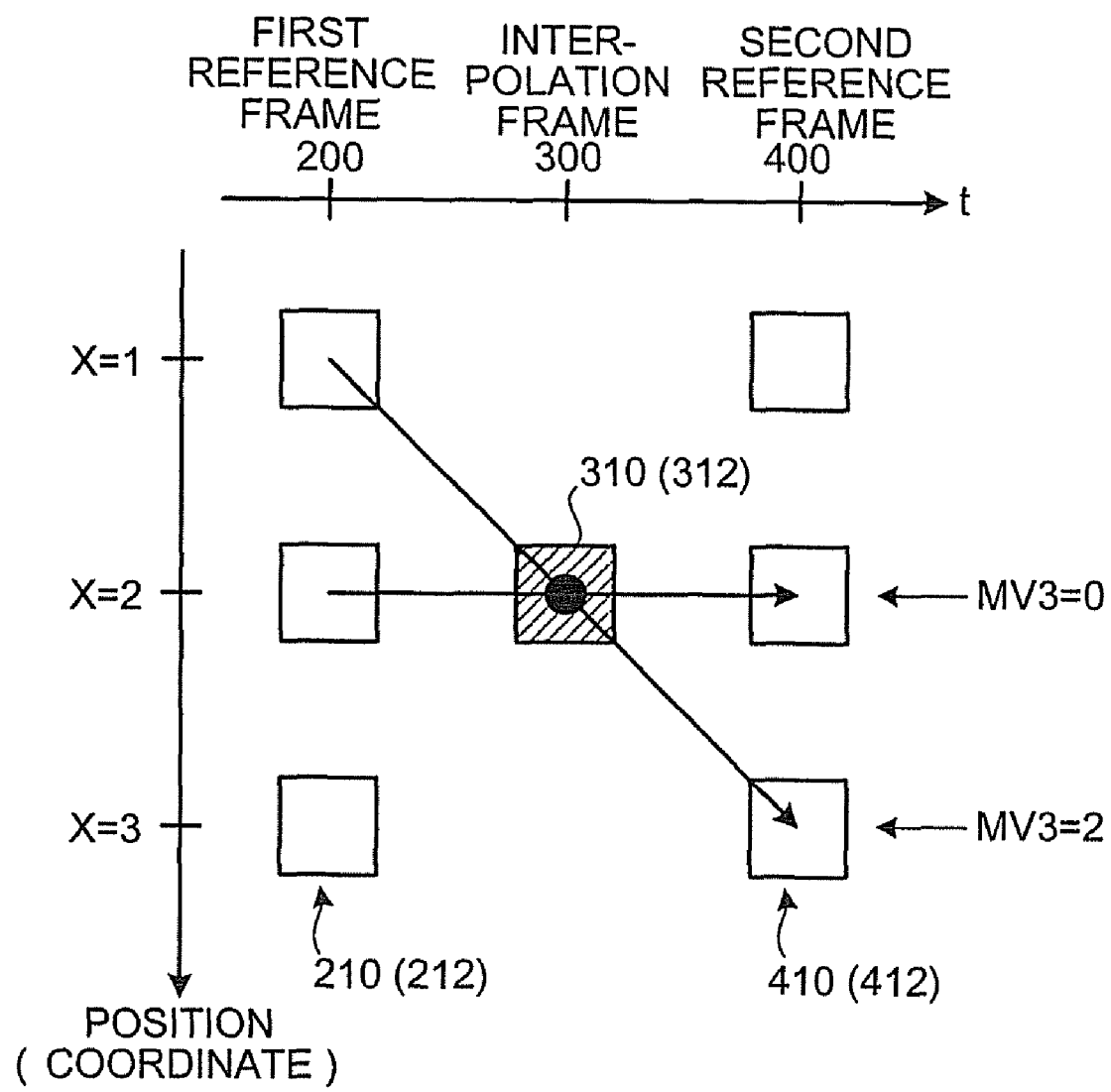
FIG. 4 is a schematic view for explaining a third motion vector between a first block and a second block according to the first embodiment.

As shown in FIG. 4, a third motion vector MV3 is a motion vector between the first block 210 and the second block 410. The interpolation frame 300 is supposed to be positioned in the middle between the first reference frame 200 and the second reference frame 400. Pixels 212, 312, and 412 are pixels that are positioned in the first block 210, the interpolation block 310, and the second block 410 respectively so as to correspond to each other. The vertical axis shown in FIG. 4 indicates positions (coordinates) in the x direction on each frame. For the purpose of simplification in the drawings hereinafter, the position of a pixel represents the position of a corresponding block which includes the pixel, for example in FIG. 4, the pixels 212, 312, and 412 represent the first block 210, the interpolation block 310, and the second block 410 respectively.

For example, the first motion vector MV1 is derived from the first block 210 at a position x=2, and then based on the resultant second motion vector MV2, the second block 410 is extracted at the position x=2. In this case, the third motion vector MV3 from the first block 210 to the second block 410 is zero. If the first block 210 is shifted to the x direction on the first reference frame 200 by one pixel, the first block 210 at a position x=1 is obtained.

Accordingly, the second block 410 obtained with the second motion vector MV2 in this case is positioned at a position x=3. As a result, the third motion vector MV3 obtained from the first block 210 at x=1 is two. Thus, when the first block 210 is shifted per pixel, the minimum unit of the third motion vector that can be estimated is two.

Figure 5:
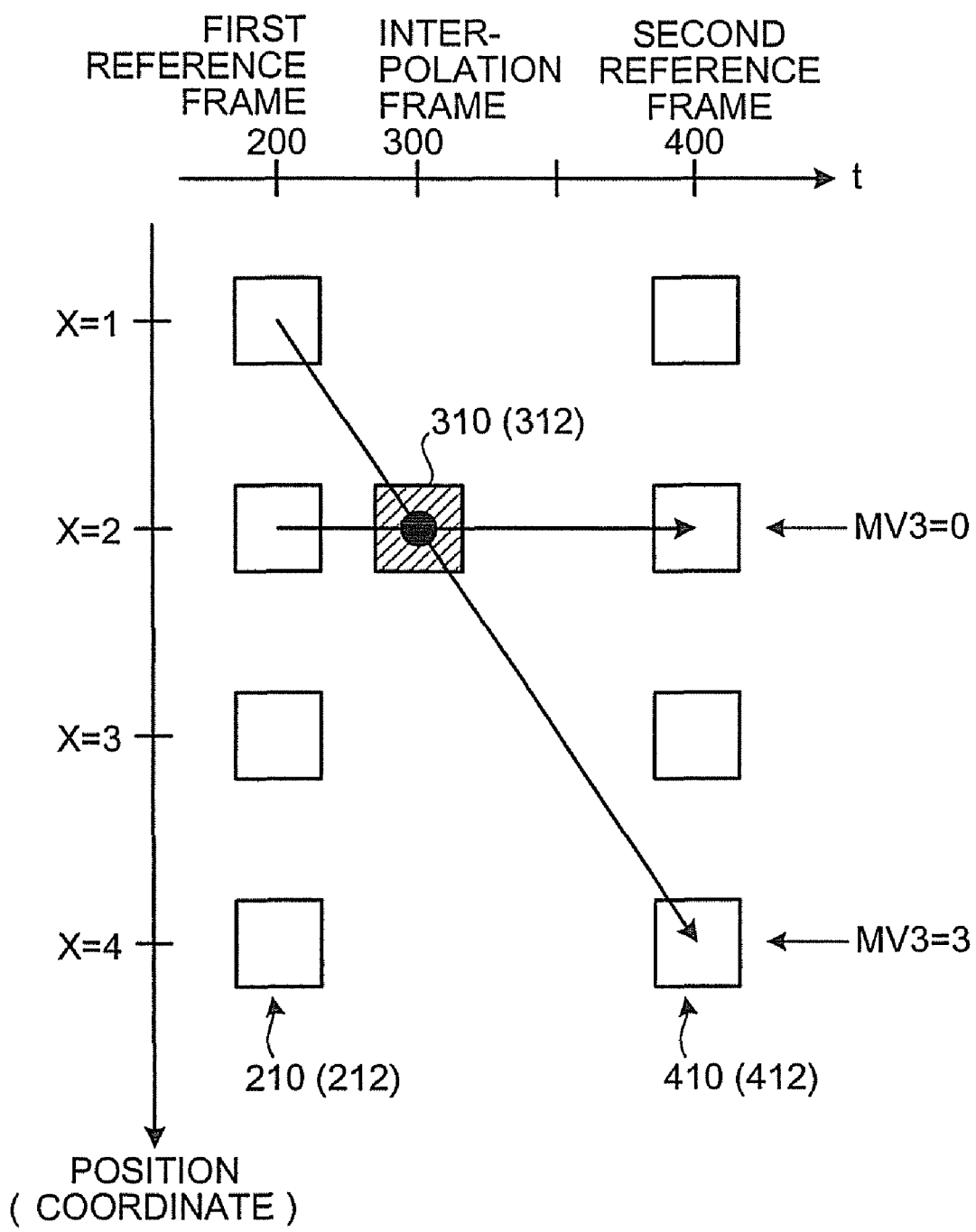
FIG. 5 is a schematic view for explaining the third motion vector, where n=3, and k=1.

As shown in FIG. 5, where n=3 and k=1, if the first block 210 is shifted from the position x=2 by one pixel, the corresponding second block 410 is deviated from the position x=2 by two pixels. In this case, the third motion vector MV3 is three. Accordingly, when the first block 210 is shifted per pixel, the minimum unit of the third motion vector that can be estimated is three.

Figure 6:
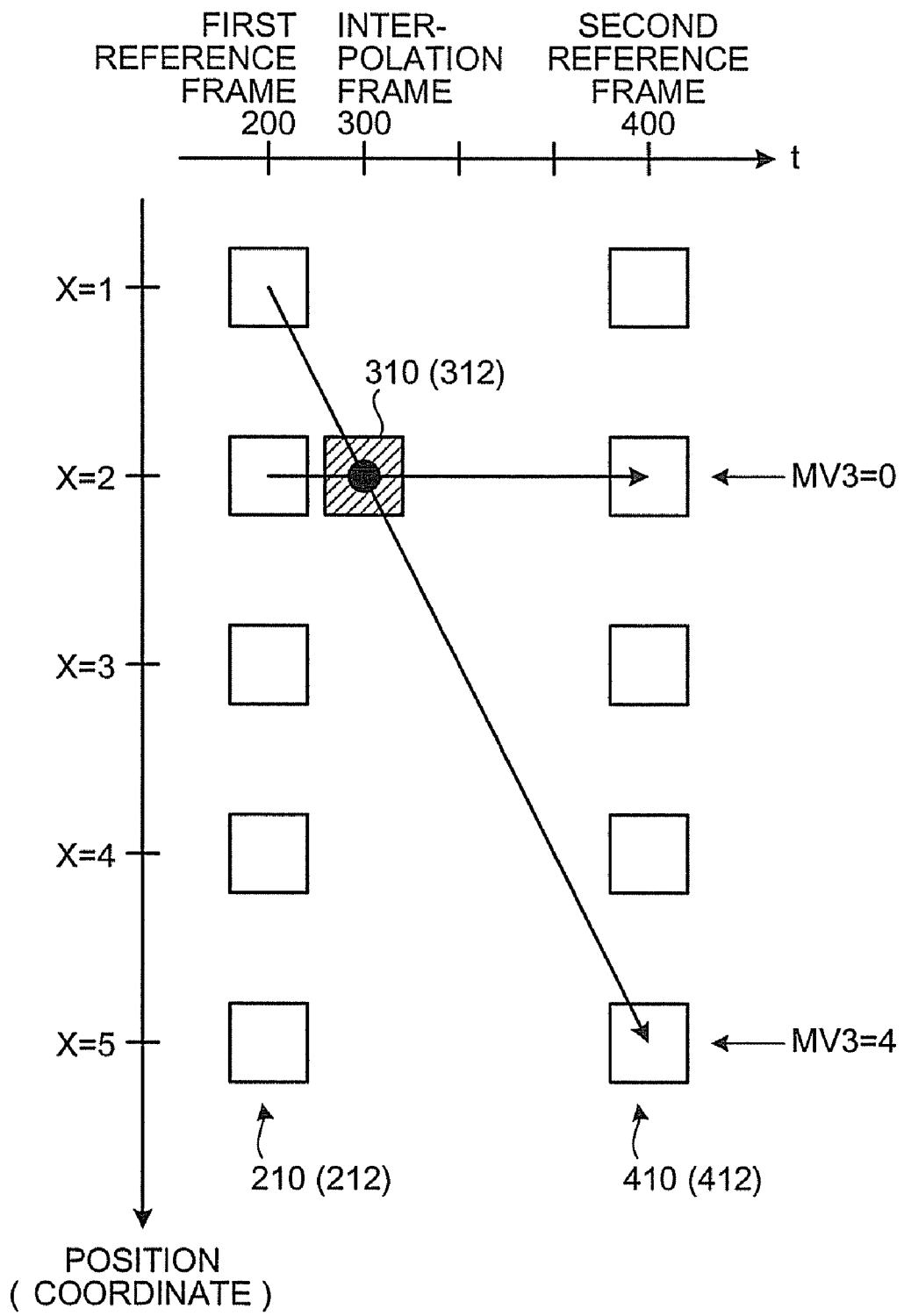
FIG. 6 is a schematic view for explaining the third motion vector, where n=4, and k=1.

As shown in FIG. 6, where n=4 and k=1, if the first block 210 is shifted from the position x=2 by one pixel, the corresponding second block 410 is deviated from the position x=2 by three pixels. In this case, the third motion vector MV3 is four. Accordingly, when the first block 210 is shifted per pixel, the minimum unit of the third motion vector that can be estimated is four.

As explained with reference to FIGS. 4 to 6, in estimation by using the first block and the second block, the minimum unit of the third motion vector that can be estimated is n/k.

In addition, as explained with reference to FIGS. 4 to 6, estimation accuracy varies in accordance with a relative value of the distance k between the first reference frame and the interpolation frame in relation to the distance n between the first reference frame and the second reference frame. Specifically, the smaller relative value of k to n results in the lower estimation accuracy.

Although here explained is the case where the first block 210 is shifted in the x direction on the first reference frame 200, the first block 210 is also shifted in the y direction likewise. In such case, the minimum unit of the third motion vector that can be estimated is similar to the case in the x direction.

Returning to FIG. 1, the third-block extracting unit 120 extracts a third block from the second reference frame. The third block is a block that is shifted from the second block per pixel by a certain distance. A distance by which the block can be shifted is (n-k)/k pixels at the maximum.

By using the first block and the third block, the motion vector can be estimated in a smaller unit, i.e., more accurately, than the case where using the first block and the second block.

Figure 7:
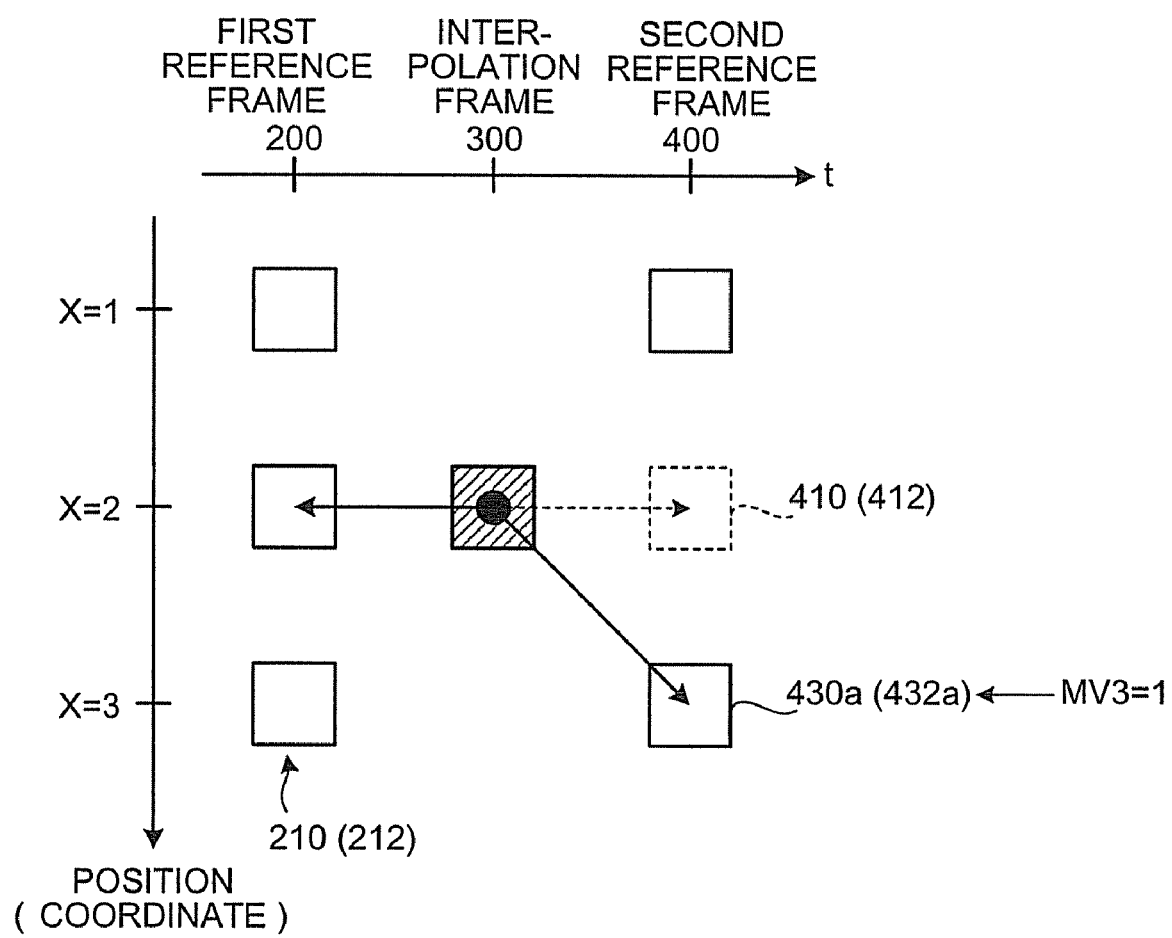
FIG. 7 is a schematic view for explaining a third block according to the first embodiment, where n=2, and k=1.

As shown in FIG. 7, where n=2 and k=1, the distance by which the block can be shifted is one pixel at the maximum. In the case where n=2 and k=1, precisely, the interpolation frame 300 is positioned in the middle between the first reference frame 200 and the second reference frame 400, a block that is shifted from the second block 410 by one pixel to the x direction, i.e., the block at x=3, is referred to as a third block 430a. The pixel 432a denotes a pixel that is present in the third block 430a and corresponds to the pixel 312. A block that is shifted from the second block 410 by one pixel in the direction of minus x is also extracted as the third block 430 likewise.

Figure 8:
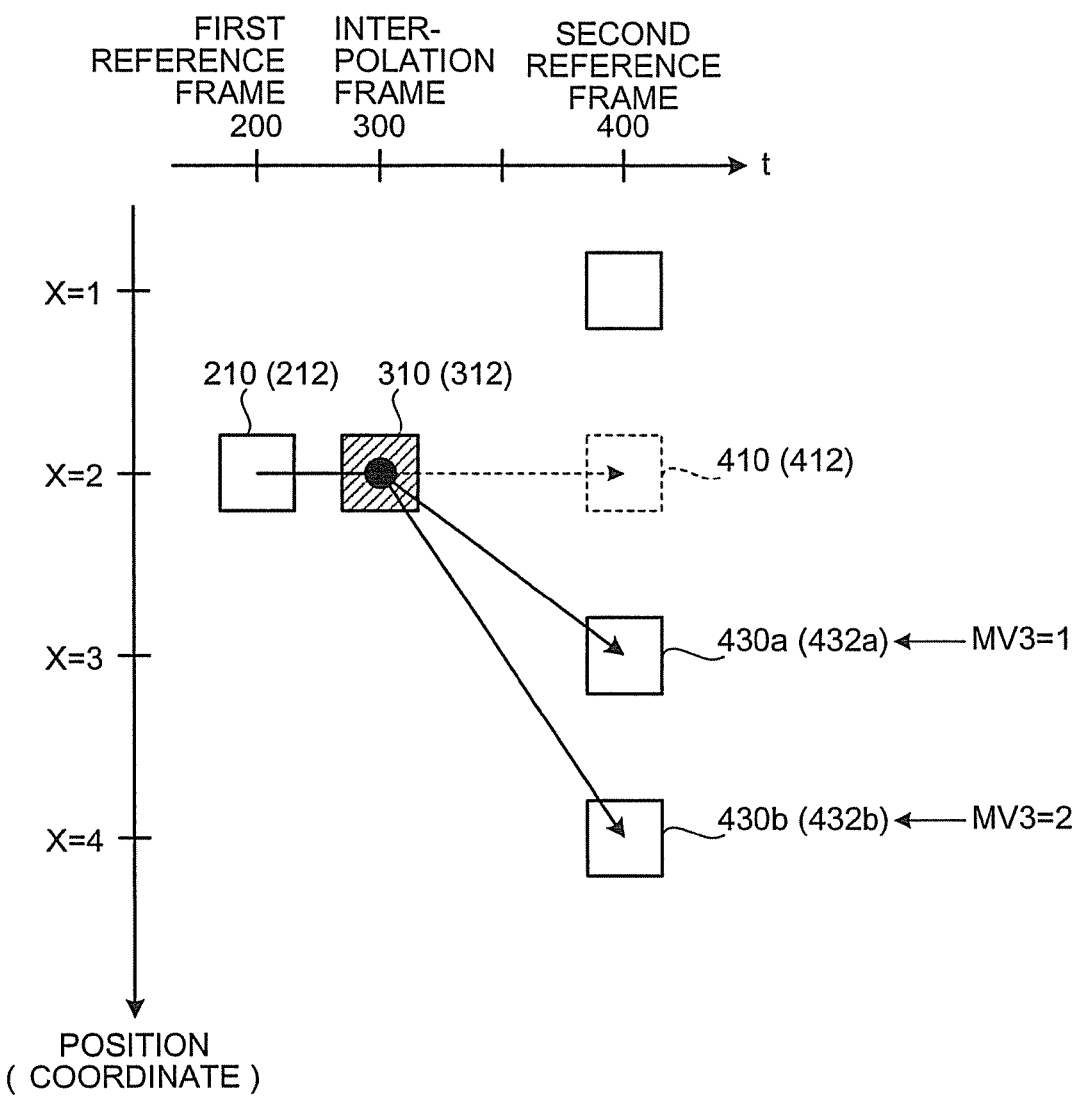
FIG. 8 is a schematic view for explaining the third blocks, where n=3, and k=1.

As shown in FIG. 8, where n=3 and k=1, a distance by which the second block 410 can be shifted is two pixels at the maximum. In this case, the block that is shifted from the second block 410 by one pixel to the x direction, i.e., the third block 430a at x=3, is extracted. Furthermore, a block that is shifted from the second block 410 by two pixels, i.e., a third block 430b at x=4, is extracted. A pixel 432b denotes a pixel that is present in the third block 430b and corresponds to the pixel 312.

Figure 9:
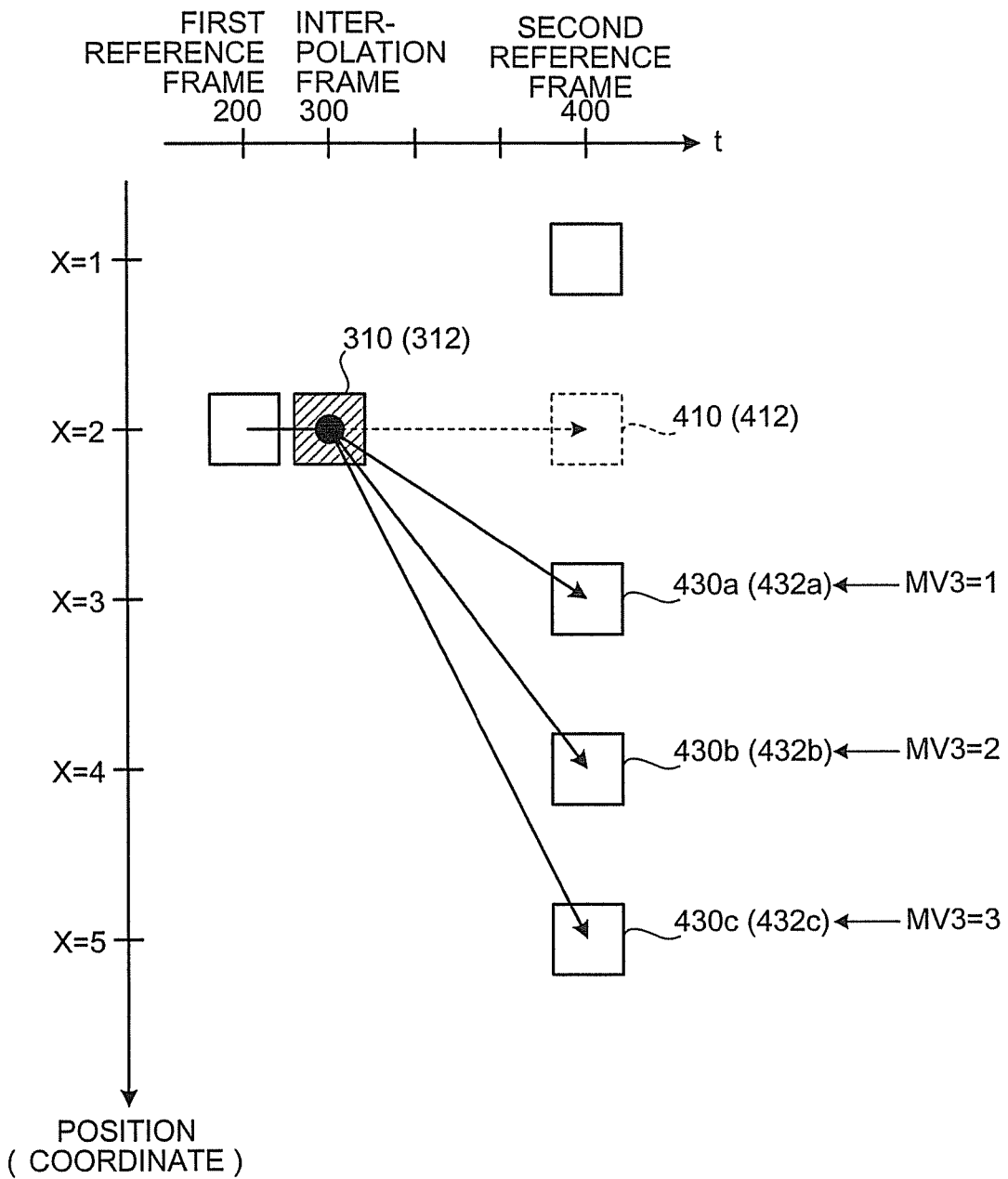
FIG. 9 is a schematic view for explaining the third blocks, where n=4, and k=1.

As shown in FIG. 9, where n=4 and k=1, a distance by which the second block 410 can be shifted is three pixels at the maximum. In this case, the block that is shifted from the second block 410 by one pixel to the x direction, i.e., the third block 430a at x=3, is extracted. Furthermore, the block that is shifted from the second block 410 by two pixels, and a block that is shifted from the second block 410 by three pixels, i.e., a third block 430c at x=5, is extracted. A pixel 432c denotes a pixel that is present in the third block 430c and corresponds to the pixel 312.

Thus, the minimum unit of the motion vector that can be estimated by estimating motion between the first block and the third block is one. In other words, a more accurate motion vector can be obtained than in the case where the motion is estimated between the first block and the second block.

There is a method of performing accurate estimation in sub-pixel to compute a more accurate motion vector by using the first block and the second block. In this method, a linear interpolation pixel is created in between actually existing pixels by performing linear interpolation. Motion is then estimated by using the created interpolation pixel. However, due to the accurate estimation in sub-pixel, the linear interpolation pixel is created at large calculation cost, and an extra memory is required for the linear interpolation pixel.

By contrast, the interpolation-frame creating apparatus 10 can reduce calculation cost by using the third block(s) that is shifted from the second block 410 by certain pixel(s). Moreover, the interpolation-frame creating apparatus 10 can suppresses increase in memory.

Returning to FIG. 1, the first-correlation calculating unit 110 calculates correlations between first blocks extracted by the first-block extracting unit 102 and second blocks. The first-block extracting unit 102 extracts all first blocks that are obtained by shifting on the first reference frame pixel by one pixel.

The second-block extracting unit 108 extracts a second block based on each of the second motion vectors MV2 obtained corresponding to each of the first blocks. The first-correlation calculating unit 110 calculates correlations between all of the obtained first blocks and all of the obtained second blocks.

The second-correlation calculating unit 122 calculates correlations between the first blocks and third blocks. The second-correlation calculating unit 122 calculates correlations between block pairs in relation to all of the first blocks. A plurality of third blocks is sometimes obtained in relation to one first block in some cases. In such case, the second-correlation calculating unit 122 calculates each correlation between the first block and each of the third blocks. To calculate correlation, the second-correlation calculating unit 122 calculates, for example, the sum of absolute differences (SAD). In another example, the second-correlation calculating unit 122 can calculate the sum of square differences (SSD).

The block-pair selecting unit 130 selects a most-highly correlated block-pair based on calculation results obtained by the first-correlation calculating unit 110 and calculation results obtained by the second-correlation calculating unit 122. Specifically, the block-pair selecting unit 130 selects a block-pair that has the smallest SAD. The most-highly correlated block-pair is selected from among pairs of the first blocks and the second blocks and pairs of the first blocks and the third blocks.

Thus, the interpolation-frame creating apparatus 10 uses results of performing correlation calculations by using the first block and the second block, i.e., symmetric searches, and correlation calculations by using the first block and the third block, i.e., unsymmetrical searches, thereby selecting a highly correlated block-pair accurately.

The motion-vector determining unit 140 computes a motion vector for the interpolation block 310 by using the block-pair obtained by the block-pair selecting unit 130. The motion compensation unit 142 performs motion compensation based on the motion vector obtained by the motion-vector determining unit 140.

Figure 10:
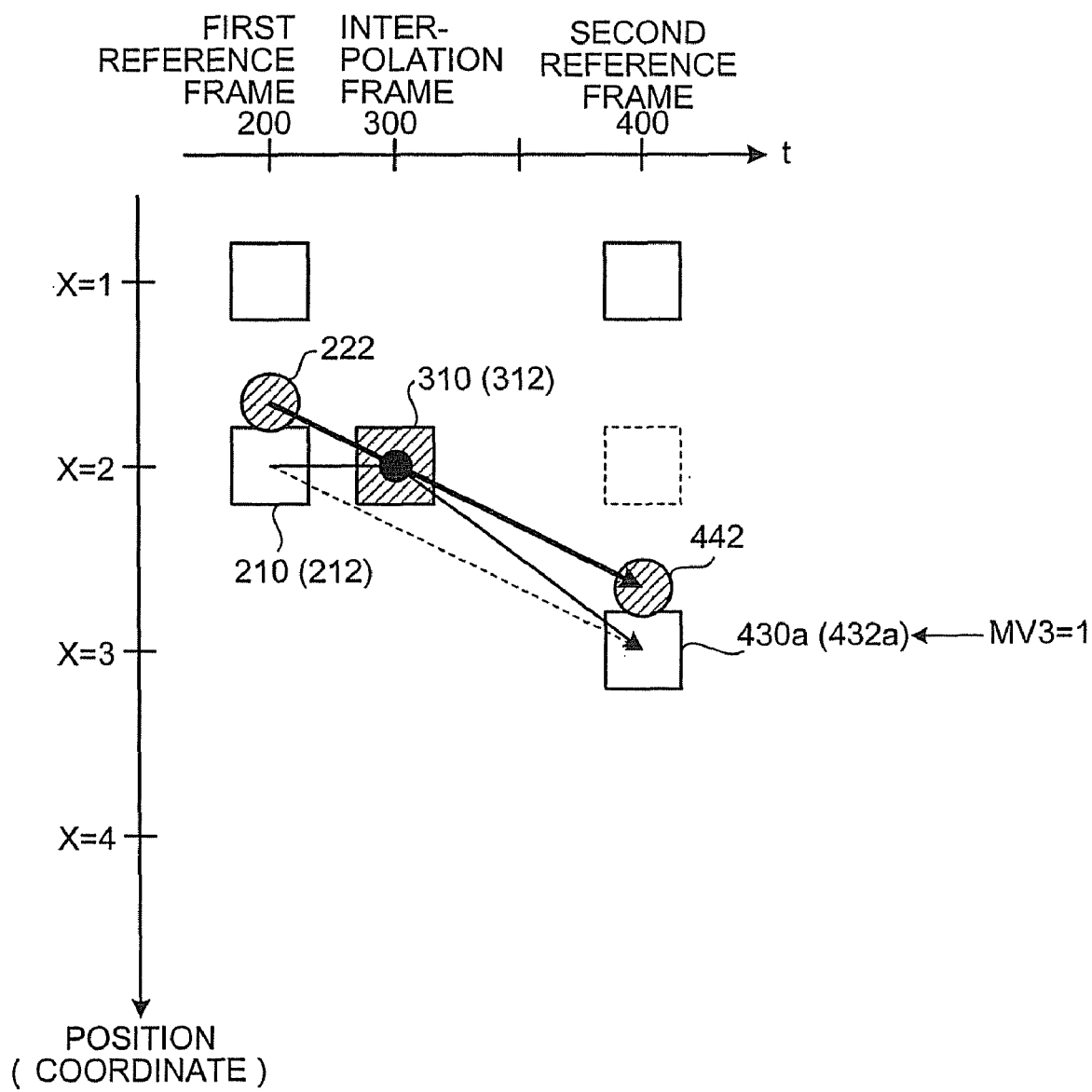
FIG. 10 is a schematic view for explaining processing performed by a motion-vector determining unit shown in FIG. 1.

As shown in FIG. 10, it is assumed that the motion-vector determining unit 140 determines the third motion vector MV3 that is derived from the first block 210 and the second block 410. In this case, a pixel position that is determined in the first reference frame 200 with the third motion vector MV3 based on the pixel 312 in the interpolation block 310 is in between pixels.

If there is no pixel at the position in the first reference frame 200 determined with the third motion vector MV3 like this, the motion-vector determining unit 140 creates a linear interpolation pixel by using an adjacent pixel. Likewise, a pixel position in the second reference frame 400 is in between pixels. If there is no pixel at the position in the second reference frame 400 determined with the third motion vector MV3 like this, the motion-vector determining unit 140 also creates a linear interpolation pixel.

The motion compensation unit 142 performs motion compensation by using such linear interpolation pixels obtained in this manner. For example, as shown in FIG. 10, suppose the motion-vector determining unit 140 creates a first linear interpolation pixel 222 in the first reference frame 200 with the third motion vector MV3. Likewise, suppose the motion-vector determining unit 140 creates a second linear interpolation pixel 442 in the second reference frame 400. In this case, the pixel 312 is assigned with an average value between the first linear interpolation pixel 222 and the second linear interpolation pixel 442.

If the pixel position in the first reference frame and the pixel position in the second reference frame, respectively determined with the third motion vector MV3 by the motion-vector determining unit 140, correspond to actually existing pixels, the motion compensation unit 142 performs motion compensation based on the determined pixels.

Figure 11:
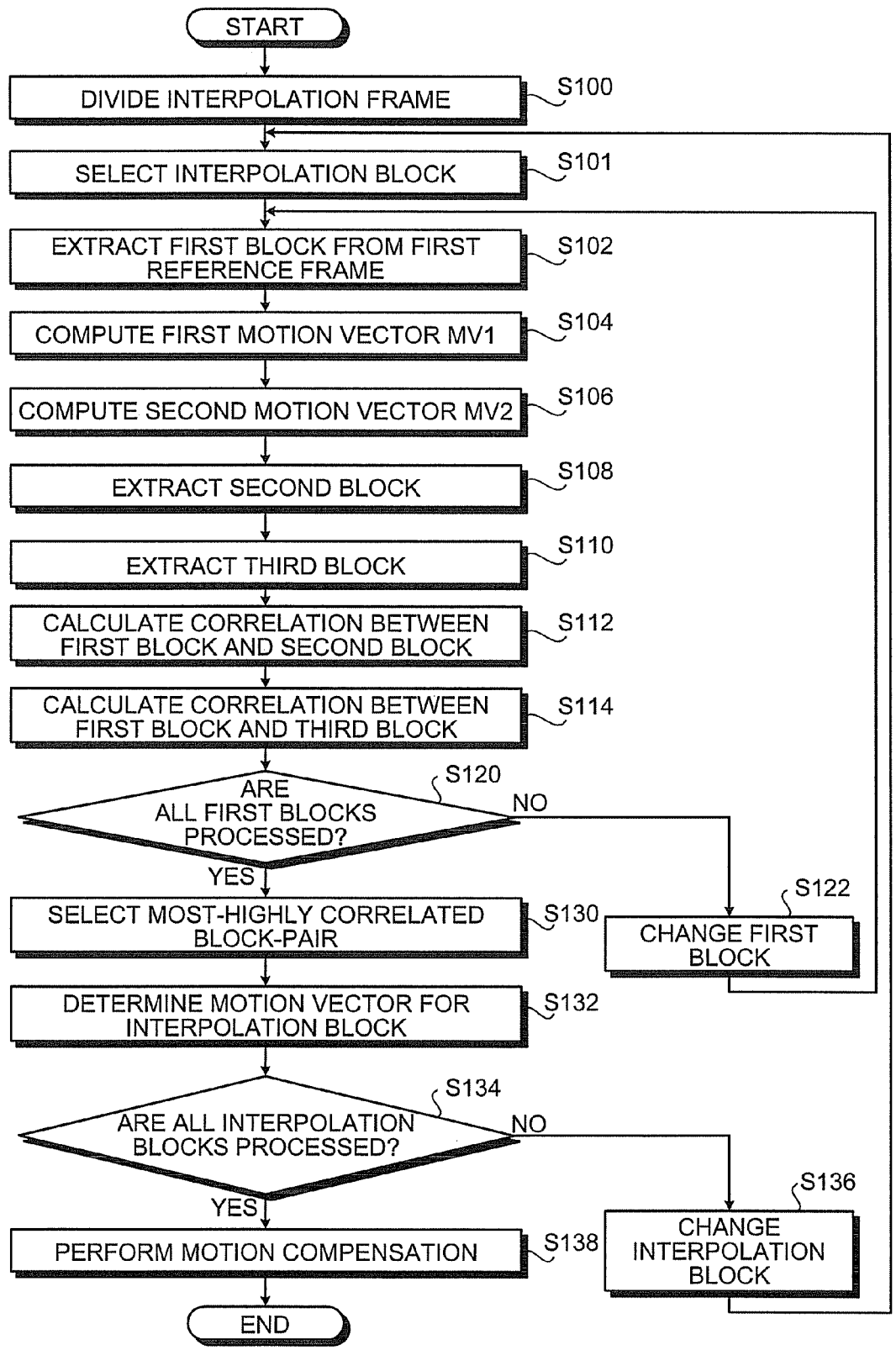
FIG. 11 is a flowchart of interpolation-frame creation performed by the interpolation-frame creating apparatus shown in FIG. 1.

As shown in FIG. 11, in interpolation-frame creation performed by the interpolation-frame creating apparatus 10, first of all, the interpolation-frame dividing unit 100 divides the interpolation frame into interpolation blocks (step S100). An interpolation block is selected from the divided interpolation blocks (step S101). Next, the first-block extracting unit 102 extracts a first block from the first reference frame (step S102). Next, the first motion-vector computing unit 104 computes a first motion vector MV1 that connects between the first block extracted by the first-block extracting unit 102 and the selected interpolation block (step S104). Next, the second motion-vector computing unit 106 computes a second motion vector MV2 by multiplying the first motion vector MV1 by [−(n−k)/k] (step S106).

Next, the second-block extracting unit 108 extracts a second block from the second reference frame based on the second motion vector MV2 (step S108). Next, the third-block extracting unit 120 extracts a third block by shifting the second block by a certain distance (step S110). Next, the first-correlation calculating unit 110 calculates a correlation between the first block and the second block (step S112). Next, the second-correlation calculating unit 122 calculates a correlation between the first block and the third block (step S114). If any of first blocks present in the first reference frame 200 has not been processed in the above processing (No at step S120), the interpolation-frame creating apparatus 10 changes the pixel position of the first block (step S122), and then goes back to step S102.

If all of the first blocks corresponding to the selected interpolation block have been processed (Yes at step S120), the block-pair selecting unit 130 selects the most-highly correlated block-pair based on calculation results obtained by the first-correlation calculating unit 110 and calculation results obtained by the second-correlation calculating unit 122 (step S130). Next, the motion-vector determining unit 140 determines a motion vector for the selected interpolation block (step S132). If any of the interpolation blocks has not been processed in the above processing (No at step S134), the interpolation-frame creating apparatus 10 changes the interpolation block (step S136), and then goes back to step S101.

If all of the interpolation blocks have been processed (Yes at step S134), the motion compensation unit 142 performs motion compensation based on motion vectors determined by the motion-vector determining unit 140 (step S138). The interpolation-frame creating apparatus 10 then completes the interpolation frame creation.

Figure 12:
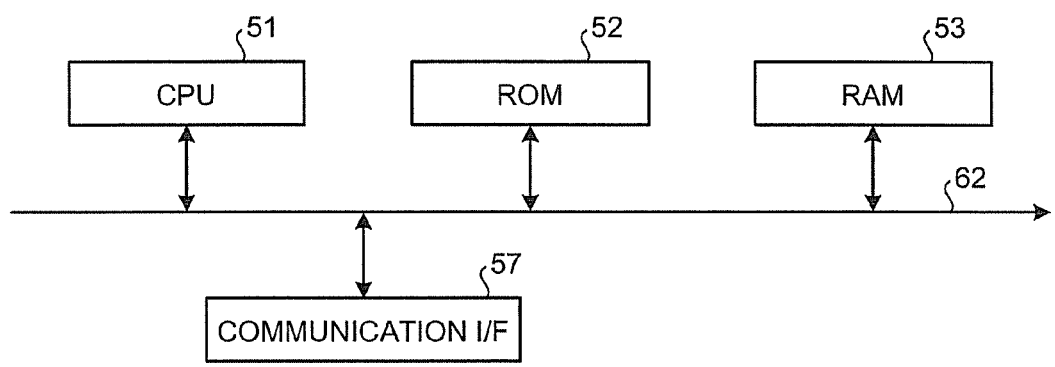
FIG. 12 is a block diagram of hardware configuration of the interpolation-frame creating apparatus according to the first embodiment.

As shown in FIG. 12, as hardware configuration, the interpolation-frame creating apparatus 10 includes a read-only memory (ROM) 52, a central processing unit (CPU) 51, a random access memory (RAM) 53, a communication interface (I/F) 57, and a bus 62. The ROM 52 stores therein computer programs, for example, a motion compensation program that causes the interpolation-frame creating apparatus 10 to execute motion compensation. The CPU 51 controls each unit in the interpolation-frame creating apparatus 10 in accordance with the computer programs stored in the ROM 52. The RAM 53 stores therein various data necessary for control of the interpolation-frame creating apparatus 10. The communication I/F 57 connects the interpolation-frame creating apparatus 10 to a network to carry out communications. The bus 62 connects each unit in the interpolation-frame creating apparatus 10.

The motion compensation program for the interpolation-frame creating apparatus 10 can be provided in a form of a computer-readable recording medium, such as a compact disc read-only memory (CD-ROM), a floppy disk (trademark) (FD), or a digital versatile disc (DVD), on which a file of the motion compensation program is recorded in an installable format or an executable format.

In this case, the motion compensation program is designed to be read out from the computer-readable recording medium and to be executed on the interpolation-frame creating apparatus 10, so that the computer program is loaded onto a main memory in the interpolation-frame creating apparatus 10, and each unit as explained in FIG. 1 is formed on the main memory.

Alternatively, the motion compensation program according to the embodiments can be provided from a computer which stores therein the motion compensation program and is connected to a network, such as the Internet, by downloading via the network.

Figure 13:
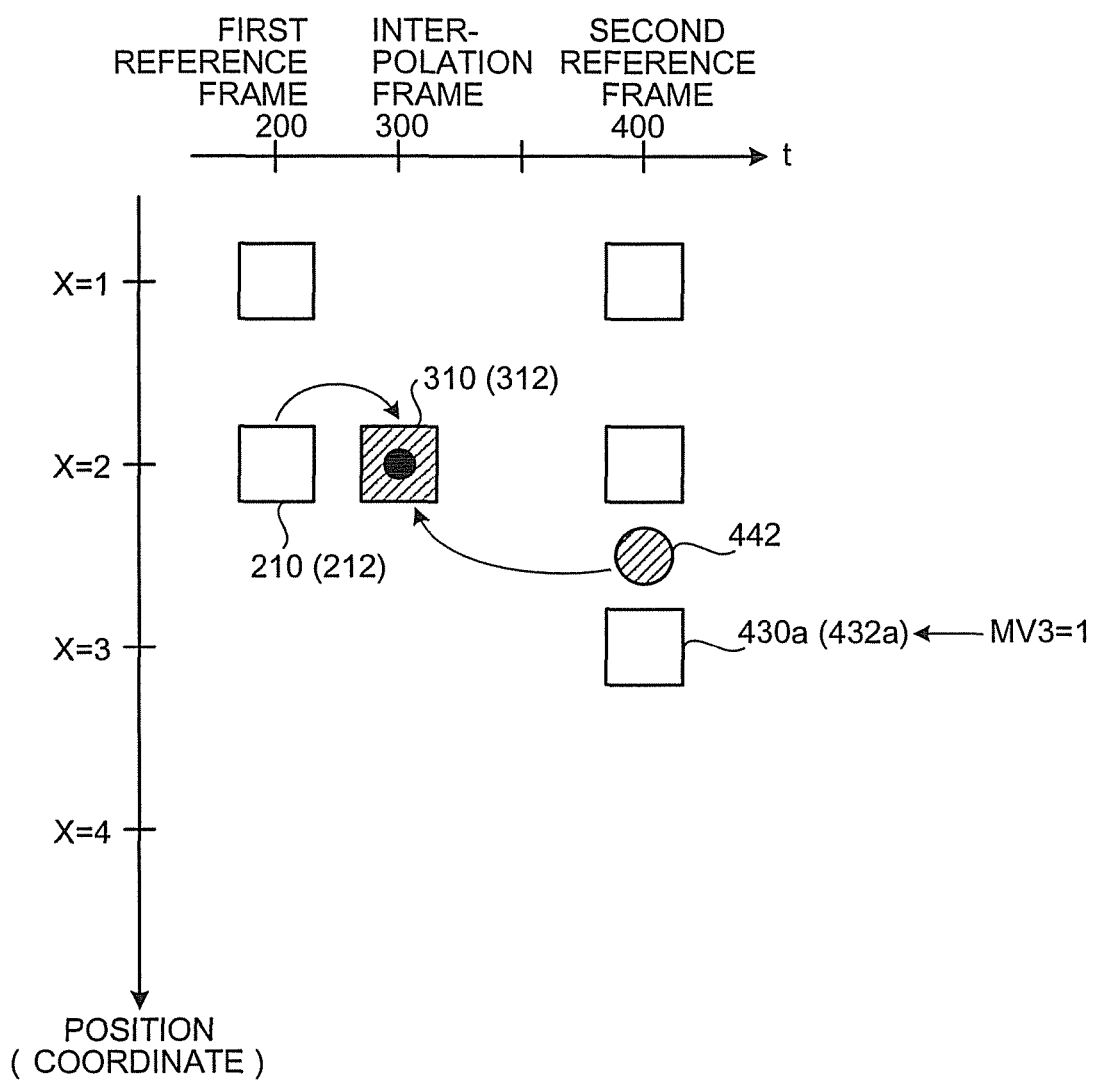
FIG. 13 is a schematic view for explaining a first modification to the first embodiment.

In addition to the first embodiment explained above, various modifications or refinements can be added. The motion compensation unit 142 according to the first embodiment creates the linear interpolation pixels on the first reference frame and the second reference frame, if the pixel positions determined in the first reference frame and the second reference frame in accordance with the third motion vector MV3 are in between pixels. Instead of this, as shown in FIG. 13, the motion compensation unit 142 can use a linear interpolation pixel only in either the first reference frame or the second reference frame, while in the other frame, using the block (pixel) that is used for computing the third motion vector MV3.

Furthermore, it is desirable that the motion compensation unit 142 creates a linear interpolation pixel only in the second reference frame, while in the first reference frame, using the pixel that is used for computing the third motion vector MV3. Deviation between an actual pixel and a pixel subjected to interpolation is larger in one reference frame that is more distant from the interpolation than the other reference frame. Therefore, the linear interpolation pixel is preferably created in the reference frame that is farther from the interpolation frame than the other frame. Consequently, the interpolation-frame creating apparatus 10 can create the interpolation frame more accurately without creating linear interpolation frame in the first reference frame.

Figure 14:
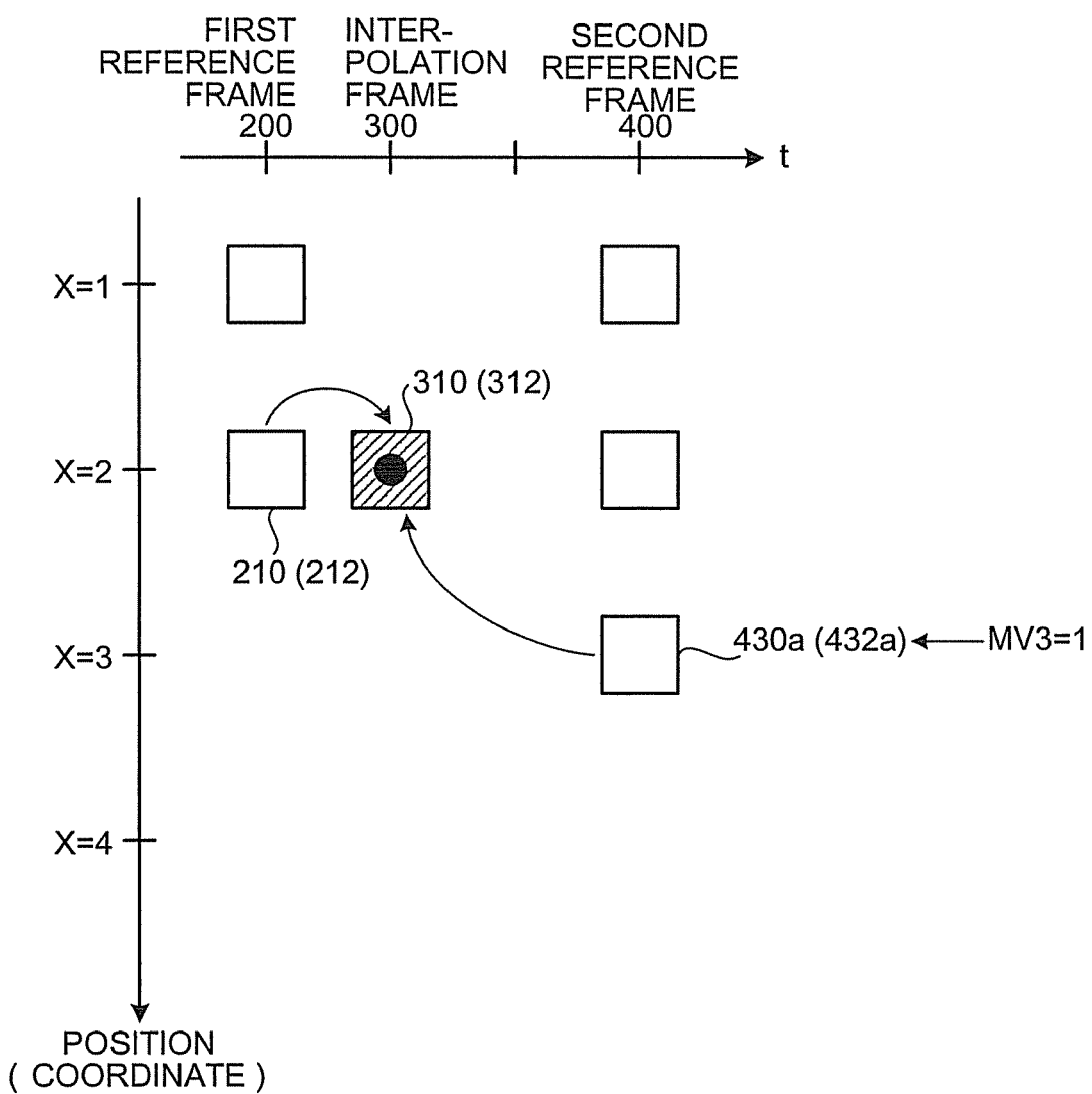
FIG. 14 is a schematic view for explaining a second modification to the first embodiment.

As shown in FIG. 14, according to another modification, if the pixel positions determined in the first reference frame and the second reference frame in accordance with the third motion vector MV3 are in between pixels, the motion compensation unit 142 can use the pixels that are used for computing the third motion vector MV3. Consequently, the interpolation-frame creating apparatus 10 can create the interpolation frame more accurately without creating any linear interpolation frame.

Figure 15:
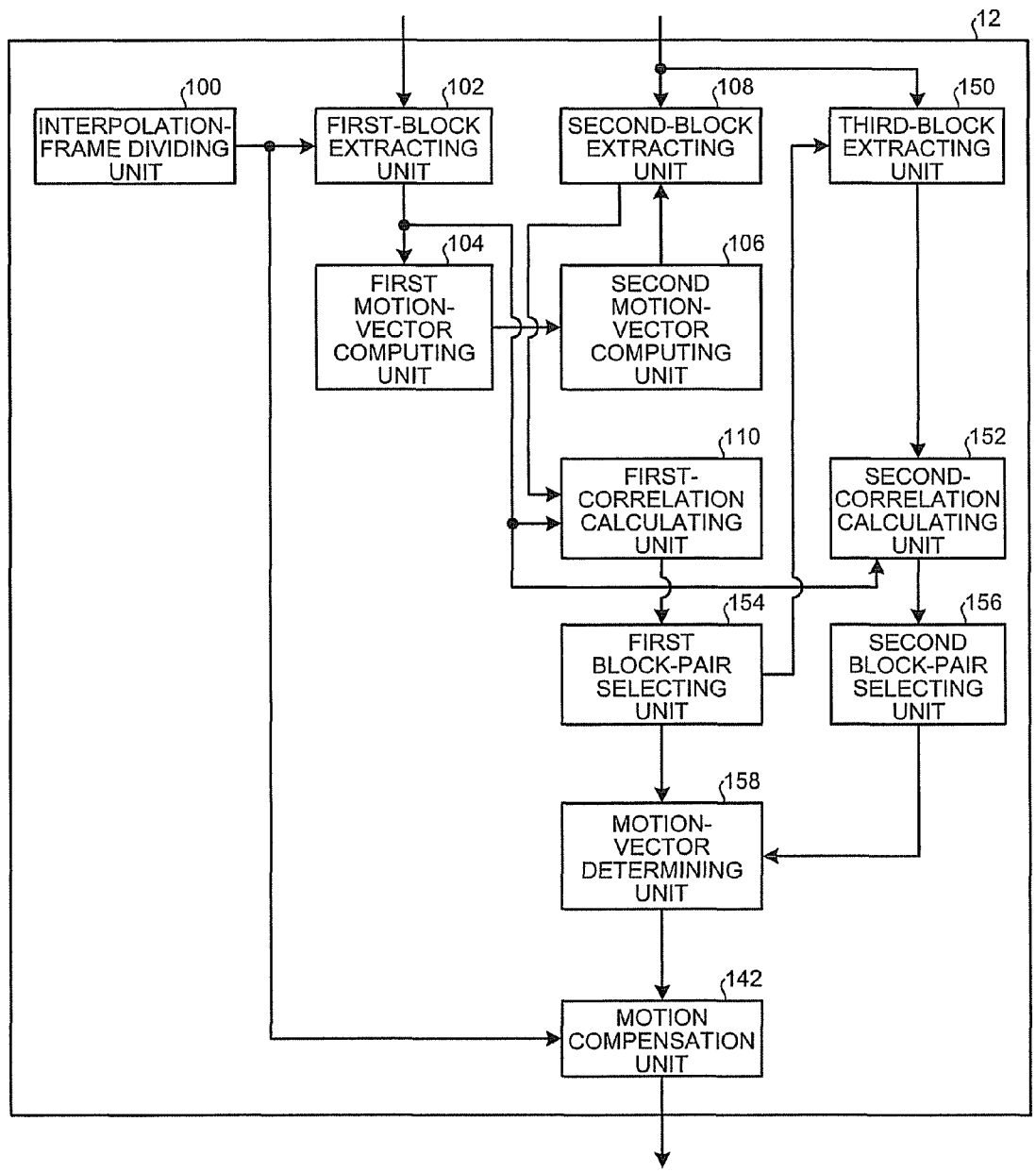
FIG. 15 is a functional block diagram of an interpolation-frame creating apparatus according to a second embodiment of the present invention.

An interpolation-frame creating apparatus 12 according to a second embodiment shown in FIG. 15 selects the most-highly correlated block-pair based on results of correlation calculations between first blocks and second blocks, and calculates a third block corresponding to the selected block pair.

The interpolation-frame creating apparatus 12 includes a first block-pair selecting unit 154 and a second block-pair selecting unit 156 instead of the block-pair selecting unit 130, a third-block extracting unit 150 instead of the third-block extracting unit 120, a second-correlation calculating unit 152 instead of the second-correlation calculating unit 122, and a motion-vector determining unit 158 instead of the motion-vector determining unit 140. The first block-pair selecting unit 154 selects the most-highly correlated block-pair based on results of correlation calculations between the first blocks and the second blocks obtained by the first-correlation calculating unit 110. Precisely, the first block-pair selecting unit 154 selects the most-highly correlated block-pair from among block pairs of the first blocks and the second blocks.

The third-block extracting unit 150 extracts a third block based on the block-pair selected by the first block-pair selecting unit 154. Precisely, the third-block extracting unit 150 extracts a third block that is shifted from the second block 410 included in the block-pair selected by the first block-pair selecting unit 154. Consequently, one or more third blocks are extracted only in relation to the selected second block, and the second-correlation calculating unit 152 calculates only correlation(s) between extracted third block(s) and the corresponding first block.

The second block-pair selecting unit 156 selects the most-highly correlated block-pair based on calculation results obtained by the second-correlation calculating unit 152. The motion-vector determining unit 158 determines a motion vector based on the block-pair selected by the second block-pair selecting unit 156.

Figure 16:
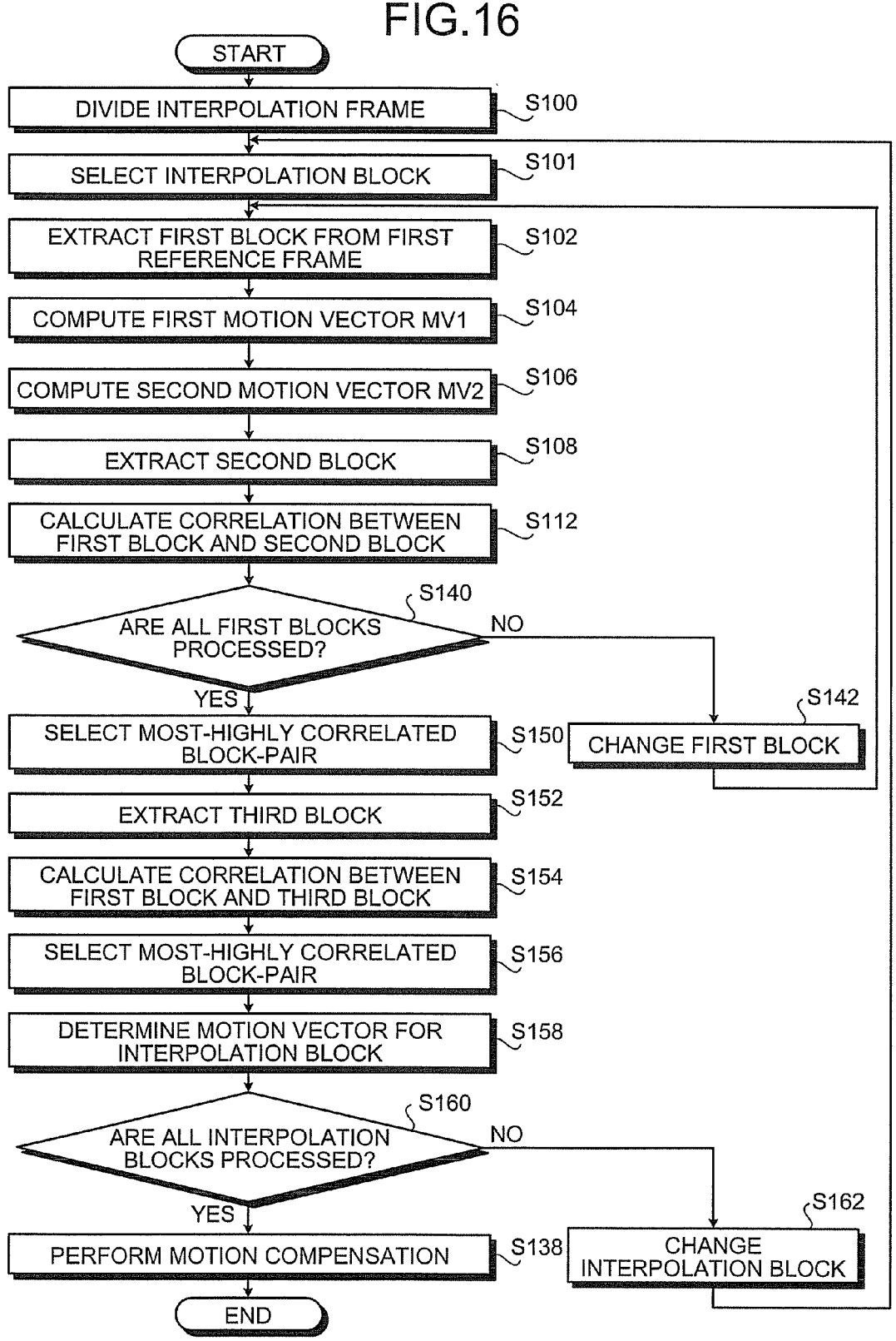
FIG. 16 is a flowchart of interpolation-frame creation performed by the interpolation-frame creating apparatus shown in FIG. 15.

As shown in FIG. 16, in the interpolation frame creation performed by the interpolation-frame creating apparatus 12, the second-block extracting unit 108 extracts a second block (step S108). Next, the first-correlation calculating unit 110 calculates a correlation between a first block and the second block (step S112).

If any of first blocks present in the first reference frame 200 has not been processed in the above processing (No at step S140), the interpolation-frame creating apparatus 12 changes the pixel position of the first block (step S142), and then goes back to step S102.

If all of the first blocks have been processed (Yes at step S140), the first block-pair selecting unit 154 selects the most-highly correlated block-pair (step S150). Next, the third-block extracting unit 150 extracts at least one third block based on the selected block-pair (step S152). Next, the second-correlation calculating unit 152 calculates correlation(s) between the third block(s) and the corresponding first block (s) (step S154). Next, the second block-pair selecting unit 156 selects the most-highly correlated block-pair based on calculation result(s) obtained by the second-correlation calculating unit 152 (step S156). Next, the motion-vector determining unit 158 determines a motion vector for an interpolation block based on the block-pair selected by the second block-pair selecting unit 156 (step S158).

If any of interpolation blocks has not been processed in the above processing (No at step S160), the interpolation-frame creating apparatus 12 changes the interpolation block (step S162), and then goes back to step S101. If all of the interpolation blocks have been processed (Yes at step S160), the motion compensation unit 142 performs motion compensation on each of the interpolation blocks (step S138). The interpolation-frame creating apparatus 12 then completes the interpolation frame creation.

Thus, the interpolation-frame creating apparatus 12 according to the second embodiment extracts only the third block(s) that corresponds to the most-highly correlated block-pair among the pairs of the first blocks and the second blocks, and subjects narrowed down blocks to processing, thereby improving efficiency in the processing.

Other configurations and processing relevant to the interpolation-frame creating apparatus 12 are similar to those relevant to the interpolation-frame creating apparatus 10.

Figure 17:
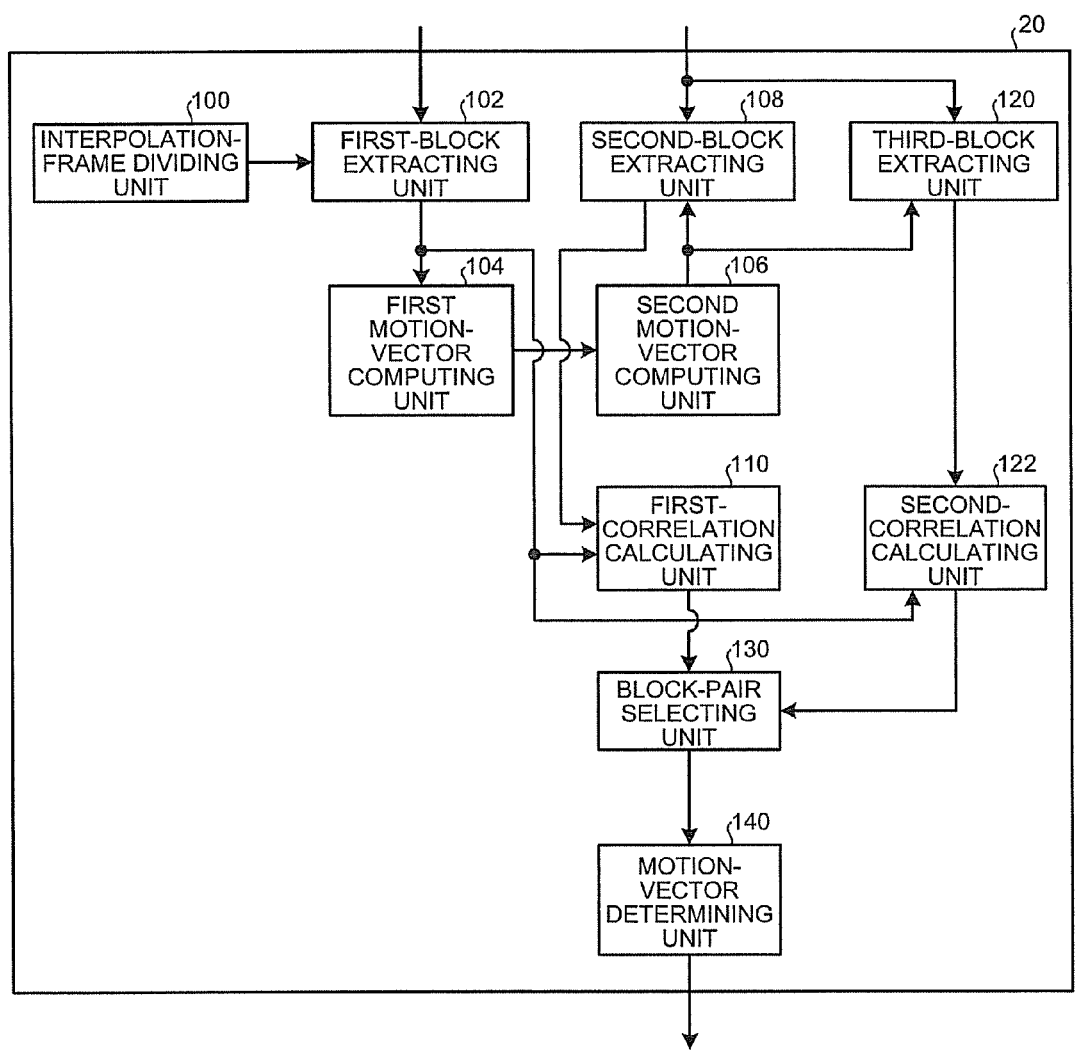
FIG. 17 is a functional block diagram of a interpolation-frame creating apparatus according to a third embodiment of the present invention.

As shown in FIG. 17, an interpolation-frame creating apparatus 20 according to a third embodiment includes the interpolation-frame dividing unit 100, the first-block extracting unit 102, the first motion-vector computing unit 104, the second motion-vector computing unit 106, the second-block extracting unit 108, the first-correlation calculating unit 110, the third-block extracting unit 120, the second-correlation calculating unit 122, the block-pair selecting unit 130, and the motion-vector determining unit 140. Precisely, the interpolation-frame creating apparatus 20 determines and outputs a motion vector.

Other configurations and processing relevant to the interpolation-frame creating apparatus 20 according to the third embodiment are similar to those relevant to the interpolation-frame creating apparatus 10 according to the first embodiment.

Figure 18:
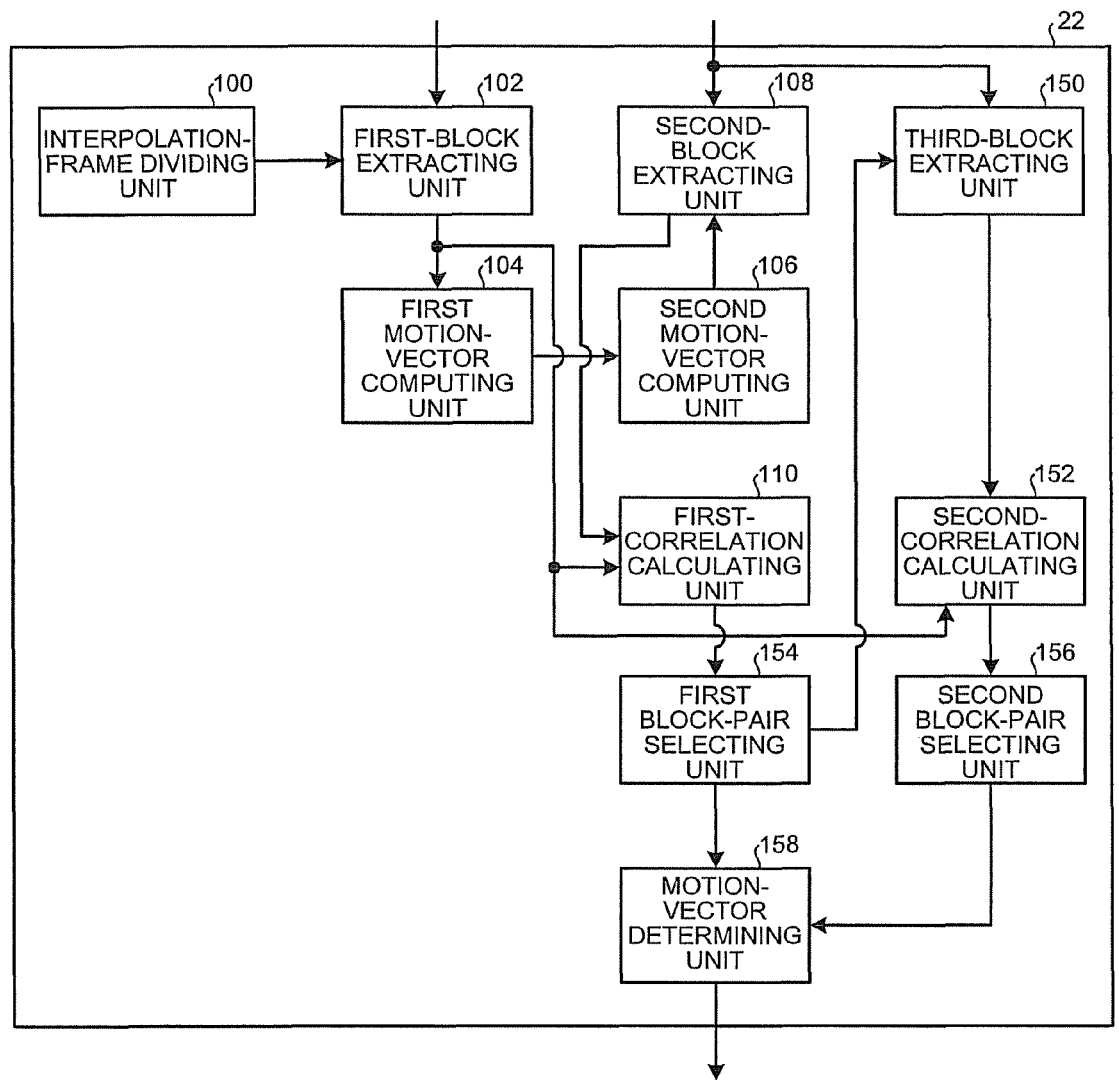
FIG. 18 is a functional block diagram of an interpolation-frame creating apparatus according to a fourth embodiment of the present invention.

As shown in FIG. 18, an interpolation-frame creating apparatus 22 according to a fourth embodiment includes the interpolation-frame dividing unit 100, the first-block extracting unit 102, the first motion-vector computing unit 104, the second motion-vector computing unit 106, the second-block extracting unit 108, the first-correlation calculating unit 110, the third-block extracting unit 150, the second-correlation calculating unit 152, the first block-pair selecting unit 154, the second block-pair selecting unit 156, and the motion-vector determining unit 158. Precisely, the interpolation-frame creating apparatus 22 determines and outputs a motion vector.

Other configurations and processing relevant to the interpolation-frame creating apparatus 22 according to the fourth embodiment are similar to those relevant to the interpolation-frame creating apparatus 12 according to the second embodiment.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An apparatus for creating an interpolation frame comprising:
a first extracting unit configured to extract a first block in relation to each of interpolation blocks from a first reference frame, the each of the interpolation blocks corresponding to a piece of an interpolation frame being located between the first reference frame and a second reference frame having an inter-frame distance n therebetween, and a distance between the interpolation frame and the first reference frame being k, where k $\leq n/2$;
a first computing unit configured to compute a first motion vector in relation to each of the interpolation blocks, the first motion vector connecting an interpolation block and the first block, the interpolation block being included in the interpolation blocks and representing each of the interpolation blocks;

a second computing unit configured to compute a second motion vector that is obtained by multiplying the first motion vector by [−(n−k)/k];

a second extracting unit configured to extract a second block in relation to each of the interpolation blocks, the second block being an area in the second reference frame determined by the second motion vector;

a first calculating unit configured to calculate a correlation between the first block and the second block;

a third extracting unit configured to extract a third block in relation to the second block from an area that is distant from the second block by (n−k)/k; or less, the third block being located at a position shifted from a position of the second block by a certain number of pixels on the second reference frame;

a second calculating unit configured to calculate a correlation between the first block and the third block that is extracted in relation to the second block corresponding to the first block;

a first selecting unit configured to select a most-highly correlated block-pair in relation to each of the interpolation blocks, from among a first block pair of the first block and the second block and a second block pair of the first block and the third block, using a first calculation result obtained by the first calculating unit and a second calculation result obtained by the second calculating unit;

a third computing unit configured to compute a motion vector for the interpolation block based on the block pair selected by the first selecting unit; and a motion compensation unit configured to perform motion compensation based on the motion vector computed by the third computing unit.

2. The apparatus according to claim 1, wherein the first extracting unit is configured to extract all of the first blocks present in a search area on the first reference frame, the first block being included in the first blocks and representing each of the first blocks;

the first calculating unit is configured to calculate correlations between all of the first blocks and second blocks each of which corresponds to each of the first blocks, the second block being included in the second blocks and representing each of the second blocks;

the third extracting unit is configured to extract all of the third blocks each of which is determined in relation to each of the first blocks, the third block being included in the third blocks and representing each of the third blocks;

the second calculating unit is configured to calculate correlations between all of the first blocks and the third blocks each of which is extracted in relation to the second block corresponding to the first block; and the first selecting unit is configured to select a most-highly correlated block-pair by using all of correlation calculation results obtained by the first calculating unit and all of correlation calculation results obtained by the second calculating unit.

3. The apparatus according to claim 1, wherein the first extracting unit is configured to extract all of the first blocks present in a search area on the first reference frame, the first block being included in the first blocks and representing each of the first blocks;

the first calculating unit is configured to calculate correlations between all of the first blocks and second blocks each of which corresponds to each of the first blocks, the second block being included in the second blocks and representing each of the second blocks;

the apparatus further comprises a second selecting unit configured to select a most-highly correlated block-pair of the first block and the second block from at least one calculation result obtained by the first calculating unit;

the third extracting unit is configured to extract the third block that is determined in relation to the first block included in the block-pair selected by the second selecting unit;

the second calculating unit is configured to calculate a correlation between the first block included in the block-pair selected by the second selecting unit and the third block extracted by the third extracting unit; and the first selecting unit is configured to select a most-highly correlated block-pair from the block-pair selected by the second selecting unit and a calculation result obtained by the second calculating unit.

4. The apparatus according to claim 1, wherein the motion compensation unit is configured to perform the motion compensation with reference to at least one of the first reference frame and the second reference frame by using the motion vector computed by the third computing unit, in response to the first selecting unit selecting the most-highly correlated block-pair between the first block and the third block.

5. The apparatus according to claim 1, wherein the motion compensation unit is configured to perform the motion compensation with reference to the first block and an area, on the second reference frame, that is determined by the motion vector computed by the third computing unit, in response to the first selecting unit selecting the most-highly correlated block-pair between the first block and the third block.

6. The apparatus according to claim 1, wherein the motion compensation unit is configured to perform the motion compensation with reference to a first pixel in the first block and a second pixel in the third block, in response to the first selecting unit selecting the most-highly correlated block-pair between the first block and the third block.

7. An apparatus for detecting a motion vector, the apparatus comprising:

a first extracting unit configured to extract a first block in relation to each of interpolation blocks from a first reference frame, the each of the interpolation blocks corresponding to a piece of an interpolation frame being located between the first reference frame and a second reference frame having an inter-frame distance n therebetween, and a distance between the interpolation frame and the first reference frame being k, where k ≦n/2;

a first computing unit configured to compute a first motion vector that connects an interpolation block and the first block, the interpolation block being included in the interpolation blocks and representing each of the interpolation blocks;

a second computing unit configured to compute a second motion vector that is obtained by multiplying the first motion vector by[−(n−k)/k];

a second extracting unit configured to extract a second block that is an area in the second reference frame determined by the second motion vector;

a first calculating unit configured to calculate a correlation between the first block and the second block;

a third extracting unit configured to extract a third block that is obtained by shifting the second block by a distance per pixel in the second reference frame, from an area that is distant from the second block by (n−k)/k; or less;

a second calculating unit configured to calculate a correlation between the first block and the third block;

a first selecting unit configured to select a most-highly correlated block-pair from among a first calculation result obtained by the first calculating unit and a second calculation result obtained by the second calculating unit; and a third computing unit configured to compute a motion vector for a block pair based on the block-pair selected by the first selecting unit.

8. A method of creating an interpolation frame, the method comprising:

extracting a first block in relation to each of interpolation blocks from a first reference frame by using a first extracting unit, the each of the interpolation blocks corresponding to a piece of an interpolation frame being located between the first reference frame and a second reference frame having an inter-frame distance n therebetween, and a distance between the interpolation frame and the first reference frame being k, where k ≦n/2;

computing a first motion vector in relation to each of the interpolation blocks by using a first computing unit, the first motion vector connecting an interpolation block and the first block, the interpolation block being included in the interpolation blocks and representing each of the interpolation blocks;

computing a second motion vector obtained by multiplying the first motion vector by [−(n−k)/k] by using a second computing unit;

extracting a second block in relation to each of the interpolation blocks by using a second extracting unit, the second block being an area in the second reference frame determined by the second motion vector;

calculating a first correlation between the first block and the second block by using a first calculating unit;

extracting a third block in relation to the second block from an area that is distant from the second block by (n−k)/k or less by using a third extracting unit, the third block being located at a position shifted from a position of the second block by a number of pixels on the second reference frame;

calculating a second correlation between the first block and the third block that is extracted in relation to the second block corresponding to the first block by using a second calculating unit;

selecting a most-highly correlated block-pair in relation to each of the interpolation blocks by using a first selecting unit, from among a first block pair of the first block and the second block and a second block pair of the first block and the third block, using a first calculation result obtained by the first calculating unit and a second calculation result obtained by the second calculating unit;

computing a motion vector for the interpolation block by using a third computing unit based on the most-highly correlated block-pair selected by the first selecting unit; and performing motion compensation by using a motion compensation unit based on the motion vector computed by the third computing unit.

9. The method according to claim 8, further comprising:

extracting all of first blocks present in a search area on the first reference frame, the first block being included in the first blocks and representing each of the first blocks;

calculating first correlations between all of the first blocks and second blocks each of which corresponds to each of the first blocks, the second block being included in the second blocks and representing each of the second blocks;

extracting all of third blocks each of which is determined in relation to each of the first blocks, the third block being included in the third blocks and representing each of the third blocks;

calculating second correlations between all of the first blocks and the third blocks each of which is extracted in relation to the second block corresponding to the first block; and selecting a most-highly correlated block-pair by using at least one first calculation result of the first correlations between the first blocks and the second blocks and at least one second calculation result of the second correlations between the first blocks and the third blocks.

10. The method according to claim 8, further comprising:

extracting all of first blocks present in a search area on the first reference frame, the first block being included in the first blocks and representing each of the first blocks;

calculating correlations between all of the first blocks and second blocks each of which corresponds to each of the first blocks, the second block being included in the second blocks and representing each of the second blocks;

selecting a most-highly correlated block-pair of the first block and the second block from at least one calculation result;

extracting the third block that is determined in relation to the first block included in the most-highly correlated block-pair of the first block and the second block;

calculating a correlation between the first block included in the most-highly correlated block-pair, of the first block and the second block, and the third block; and selecting a most-highly correlated block-pair from among the most-highly correlated block-pair of the first block and the second block, and a calculation result of the correlation between the first block and the third block.

11. A method of detecting a motion vector, the method comprising:

extracting a first block in relation to each of interpolation blocks from a first reference frame, the each of the interpolation blocks corresponding to a piece of an interpolation frame being located between the first reference frame and a second reference frame having an inter-frame distance n therebetween, and a distance between the interpolation frame and the first reference frame being k, where k ≦n/2;

computing a first motion vector in relation to each of the interpolation blocks, the first motion vector connecting an interpolation block and the first block, the interpolation block being included in the interpolation blocks and representing each of the interpolation blocks;

computing a second motion vector that is obtained by multiplying the first motion vector by [−(n−k)/k];

extracting a second block in relation to each of the interpolation blocks, the second block being an area in the second reference frame determined by the second motion vector;

calculating a first correlation between the first block and the second block;

extracting a third block in relation to the second block, from an area that is distant from the second block by (n−k)/k or less, the third block being located at a position shifted from a position of the second block by a number of pixels on the second reference frame;

calculating a second correlation between the first block and the third block that is extracted in relation to the second block corresponding to the first block;

selecting a most-highly correlated block-pair in relation to each of the interpolation blocks, from among a first block pair of the first block and the second block and a second block pair of the first block and the third block, using a first correlation calculation result between the first block and the second block and a second correlation calculation result between the first block and the third block; and computing a motion vector for the interpolation block based on the most-highly correlated block pair.

12. A computer program product having a computer-readable medium including programmed instructions for performing interpolation frame creation, wherein the instructions, in response to execution, cause a computer to perform:

extracting a first block in relation to each of interpolation blocks from a first reference frame, the each of the interpolation blocks corresponding to a piece of an interpolation frame being located between the first reference frame and a second reference frame having an interframe distance n therebetween, and a distance between the interpolation frame and the first reference frame being k, where k ≦/2;

computing a first motion vector in relation to each of the interpolation blocks, the first motion vector connecting an interpolation block and the first block, the interpolation block being included in the interpolation blocks and representing each of the interpolation blocks;

computing a second motion vector that is obtained by multiplying the first motion vector by [−(n−k)/k];

extracting a second block in relation to each of the interpolation blocks, the second block being an area in the second reference frame determined by the second motion vector;

calculating a first correlation between the first block and the second block;

extracting a third block in relation to the second block from an area that is distant from the second block by (n−k)/k or less, the third block being located at a position shifted from a position of the second block by a number of pixels on the second reference frame;

calculating a second correlation between the first block and the third block that is extracted in relation to the second block corresponding to the first block;

selecting a most-highly correlated block-pair in relation to each of the interpolation blocks, from among a first block pair of the first block and the second block and a second block pair of the first block and the third block, using a first correlation calculation result between the first block and the second block and a second correlation calculation result between the first block and the third block;

computing a motion vector for the interpolation block based on the most-highly correlated block pair; and performing motion compensation based on the motion vector.

13. The computer program product according to claim 12, wherein the instructions cause the computer to further perform:

extracting all of first blocks present in a search area on the first reference frame, the first block being included in the first blocks and representing each of the first blocks;

calculating first correlations between all of the first blocks and the second blocks each of which corresponds to each of the first blocks, the second block being included in the second blocks and representing each of the second blocks;

extracting all of third blocks each of which is determined in relation to each of the first blocks, the third block being included in the third blocks and representing each of the third blocks;

calculating second correlations between all of the first blocks and third blocks each of which is extracted in relation to the second block corresponding to the first block; and selecting a most-highly correlated block-pair by using second at least one first calculation result of the first correlations between the first blocks and the second blocks and at least one second calculation result of the second correlations between the first blocks and the third blocks.

14. The computer program product according to claim 12, wherein the instructions cause the computer to further perform:

extracting all of first blocks present in a search area on the first reference frame, the first block being included in the first blocks and representing each of the first blocks;

calculating correlations between all of the first blocks and the second blocks each of which corresponds to each of the first blocks, the second block being included in the second blocks and representing each of the second blocks;

selecting a most-highly correlated block-pair of the first block and the second block from at least one calculation result;

extracting the third block that is determined in relation to the first block included in the most-highly correlated block pair of the first block and the second block;

calculating a correlation between the first block included in the most-highly correlated block-pair, of the first block and the second block, and the third block; and selecting a most-highly correlated block-pair from among the most-highly correlated block-pair of the first block and the second block, and a calculation result of the correlation between the first block and the third block.

15. A computer program product having a computer-readable medium including programmed instructions for detecting a motion vector, wherein the instructions, in response to execution, cause a computer to perform:

extracting a first block in relation to each of interpolation blocks from a first reference frame, the each of the interpolation blocks corresponding to a piece of interpolation frame being located between the first reference frame and a second reference frame having an interframe distance n therebetween, and a distance between the interpolation frame and the first reference frame being k, where k ≦n/2;

computing a first motion vector in relation to each of the interpolation blocks, the first motion vector connecting an interpolation block and the first block, the interpolation block being included in the interpolation blocks and representing each of the interpolation blocks;

computing a second motion vector that is obtained by multiplying the first motion vector by [−(n−k)/k];

extracting a second block in relation to each of the interpolation blocks, the second block being an area in the second reference frame determined by the second motion vector;

calculating a first correlation between the first block and the second block;

extracting a third block in relation to the second block, from an area that is distant from the second block by (n−k)/k or less, the third block being located at a position shifted from a position of the second block by a number of pixels on the second reference frame;

calculating a second correlation between the first block and the third block that is extracted in relation to the second block corresponding to the first block;

selecting a most-highly correlated block-pair in relation to each of the interpolation blocks, from among a first block pair of the first block and the second block and a second block pair of the first block and the third block, using a first correlation calculation result between the first block and the second block and a second correlation calculation result between the first block and the third block; and computing a motion vector for the interpolation block based on the most-highly correlated block-pair.

* * * * *